United States Patent
Irie et al.

(10) Patent No.: US 12,233,556 B2
(45) Date of Patent: Feb. 25, 2025

(54) CONTROL DEVICE, CONTROL METHOD, AND PROGRAM

(71) Applicant: SONY CORPORATION, Tokyo (JP)

(72) Inventors: Atsushi Irie, Kanagawa (JP); Hirotaka Suzuki, Kanagawa (JP); Takara Kasai, Tokyo (JP); Masanobu Nakamura, Tokyo (JP); Andrew Shin, Tokyo (JP)

(73) Assignee: SONY CORPORATION, Tokyo (JP)

( * ) Notice: Subject to any disclaimer, the term of this patent is extended or adjusted under 35 U.S.C. 154(b) by 451 days.

(21) Appl. No.: 17/263,854

(22) PCT Filed: Jul. 25, 2019

(86) PCT No.: PCT/JP2019/029181
§ 371 (c)(1),
(2) Date: Jan. 27, 2021

(87) PCT Pub. No.: WO2020/031718
PCT Pub. Date: Feb. 13, 2020

(65) Prior Publication Data
US 2021/0229284 A1    Jul. 29, 2021

(30) Foreign Application Priority Data
Aug. 8, 2018  (JP) ................ 2018-149106

(51) Int. Cl.
*B25J 9/16*  (2006.01)
(52) U.S. Cl.
CPC .......... *B25J 9/1674* (2013.01); *B25J 9/1661* (2013.01)
(58) Field of Classification Search
CPC ...... B25J 9/1674; B25J 9/1661; B25J 9/1628; B25J 9/163; B25J 9/1653; B25J 9/1656;
(Continued)

(56) References Cited

U.S. PATENT DOCUMENTS

| 9,561,590 B1* | 2/2017 | Nusser | B25J 9/1661 |
| 2011/0288667 A1* | 11/2011 | Noda | G05B 19/42 700/98 |

(Continued)

FOREIGN PATENT DOCUMENTS

| CN | 102609089 A | 7/2012 |
| CN | 105269582 A | 1/2016 |

(Continued)

OTHER PUBLICATIONS

Mohammed et al., Active collision avoidance for human-robot collaboration driven by vision sensors, International Journal of Computer Integrated Manufacturing, Sep. 2017, pp. 970-980, vol. 30, No. 9.

*Primary Examiner* — Abby Y Lin
*Assistant Examiner* — Esvinder Singh
(74) *Attorney, Agent, or Firm* — Paratus Law Group, PLLC

(57) ABSTRACT

There is provided a control device, a control method, and a program that can prevent failure of an operation of a robot. The control device according to an aspect of the present technology includes a state transition determination section that controls an operation of a robot to perform a predetermined process before a task results in failure in a case where a state transition of the robot in performing the task follows a failure state transition that is preset as a state transition that results in the failure of the task. The present technology can be applied to a robot capable of autonomous operation.

13 Claims, 23 Drawing Sheets

(58) Field of Classification Search
CPC .... B25J 9/1669; B25J 9/1679; B25J 11/0095;
G05B 19/0428; G05B 19/045; G05B
19/048; G05B 2219/13009; G05B
2219/23285; G05B 2219/23287; G05B
2219/32353; G05B 2219/24202; G05B
2219/32207; G05B 2219/33315; G05B
2219/42274; G05B 19/0426; G05B
2219/14105; G05B 2219/23078; G05B
2219/24031; G05B 2219/24199; G05B
2219/25235; G05B 2219/25377
See application file for complete search history.

(56) References Cited

U.S. PATENT DOCUMENTS

| | | | | |
|---|---|---|---|---|
| 2012/0277909 | A1* | 11/2012 | Ouchi | B25J 9/1661 700/254 |
| 2016/0260161 | A1* | 9/2016 | Atchley | G06Q 50/40 |
| 2016/0264262 | A1* | 9/2016 | Colin | B25J 5/007 |
| 2017/0015002 | A1* | 1/2017 | Ito | B25J 9/1674 |
| 2018/0147731 | A1 | 5/2018 | Yoshizawa | |
| 2020/0246985 | A1* | 8/2020 | Yoshida | B25J 19/06 |
| 2020/0406476 | A1* | 12/2020 | Kato | B65B 69/00 |
| 2021/0001480 | A1* | 1/2021 | Artes | B25J 9/16 |

FOREIGN PATENT DOCUMENTS

| | | |
|---|---|---|
| CN | 106358370 A | 1/2017 |
| DE | 19625637 A1 | 1/1998 |
| JP | H11-065649 A | 3/1999 |
| JP | H11-188680 A | 7/1999 |
| JP | 2003260685 A | 9/2003 |
| JP | 2003-291083 A | 10/2003 |
| JP | 2007-303866 A | 11/2007 |
| JP | 2012-073769 A | 4/2012 |
| JP | 2015-231640 A | 12/2015 |
| JP | 2016-155212 A | 9/2016 |
| WO | WO 2017/163251 A2 | 9/2017 |
| WO | WO 2018/012446 A1 | 1/2018 |

* cited by examiner

FIG. 1
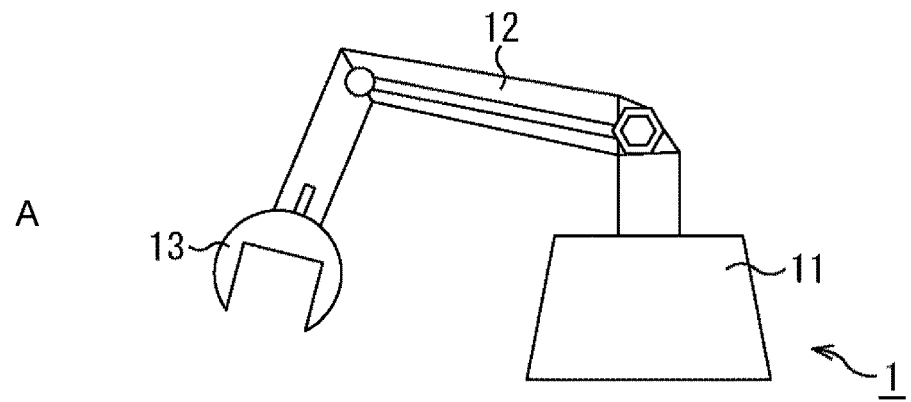
A
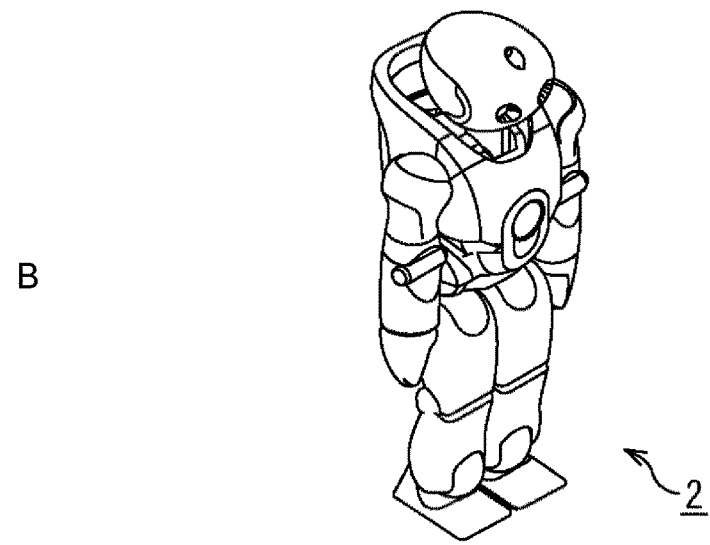
B

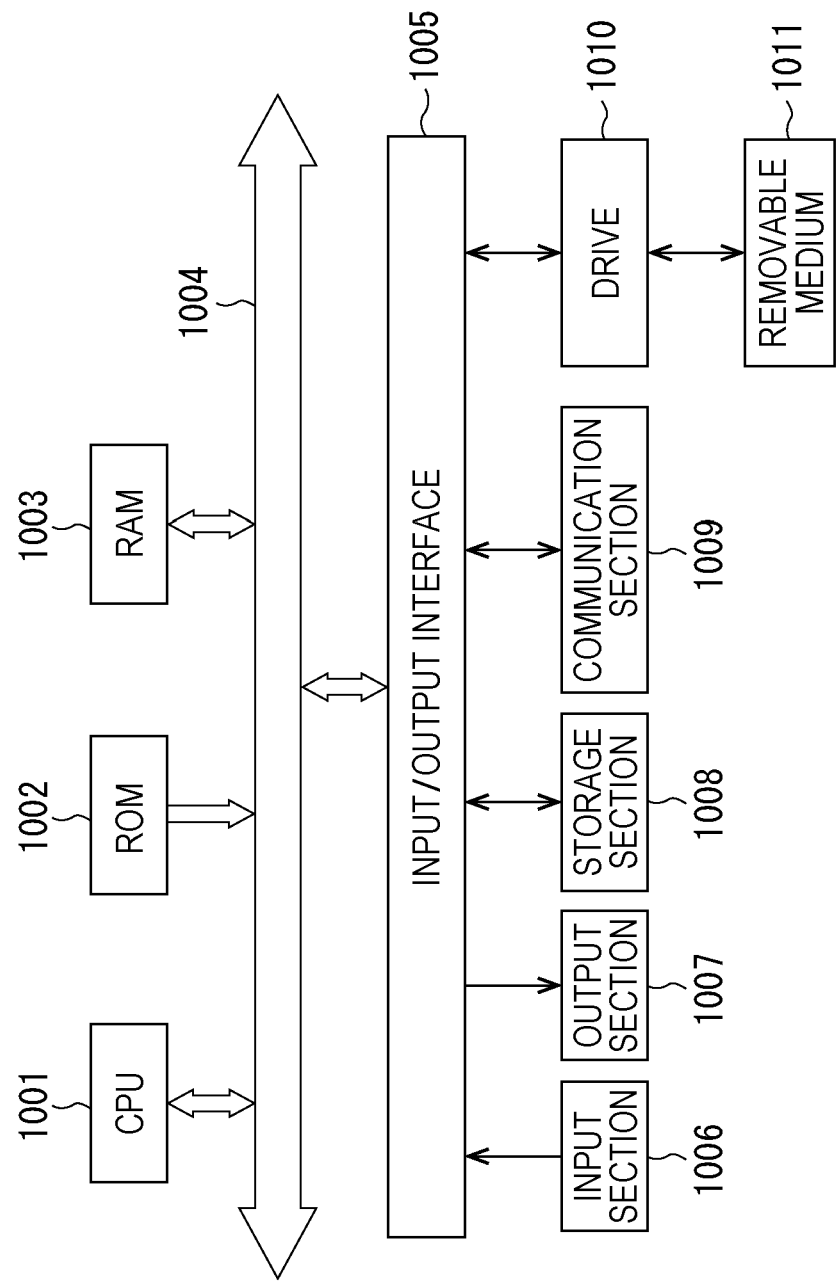

CONTROL DEVICE, CONTROL METHOD, AND PROGRAM

CROSS REFERENCE TO PRIOR APPLICATION

This application is a National Stage Patent Application of PCT International Patent Application No. PCT/JP2019/029181 (filed on Jul. 25, 2019) under 35 U.S.C. § 371, which claims priority to Japanese Patent Application No. 2018-149106 (filed on Aug. 8, 2018), which are all hereby incorporated by reference in their entirety.

TECHNICAL FIELD

The present technology relates to a control device, a control method, and a program, and particularly to a control device, a control method, and a program that can prevent failure of an operation of a robot.

BACKGROUND ART

In a case of managing a robot in an environment where a person is present, such as a factory, it is necessary to prevent malfunction of the robot from a viewpoint of safety and the like. In a case of operating on the basis of a model obtained by machine learning or a preset rule, it is difficult for the robot itself to determine failure of the operation.

For example, Patent Document 1 discloses a technique for determining success or failure of an operation on the basis of a time-series pattern of sensor output data expected for a case where the operation succeeds and a time-series pattern of sensor output data during the operation. Each polygonal line portion of the time-series pattern is regarded as one state and each node is regarded as an event for a state change, and an allowable range is set for each state and event to monitor a state transition.

CITATION LIST

Patent Document

Patent Document 1: Japanese Patent Application Laid-Open No. H11-065649
Patent Document 2: Japanese Patent Application Laid-Open No. 2007-303866
Patent Document 3: Japanese Patent Application Laid-Open No. 2012-73769

SUMMARY OF THE INVENTION

Problems to be Solved by the Invention

In the above-described technique, a user needs to set an allowable range for each state and event. Furthermore, it is not possible to automatically update the time-series pattern of the sensor output data expected for the case where the operation succeeds or perform a recovery in a case where it is determined that the operation fails.

It would be convenient if the robot could automatically update data that serves as a criterion for determining whether or not the operation succeeds, or the robot could automatically redo the operation in a case where it is determined that the operation fails.

The present technology has been made in view of such circumstances and is to make it possible to prevent failure of an operation of a robot.

Solutions to Problems

A control device according to an aspect of the present technology includes a state transition determination section that controls an operation of a robot to perform a predetermined process before a task results in failure in a case where a state transition of the robot in performing the task follows a failure state transition that is preset as a state transition that results in the failure of the task.

In an aspect of the present technology, an operation of a robot is controlled to perform a predetermined process before a task results in failure in a case where a state transition of the robot in performing the task follows a failure state transition that is preset as a state transition that results in the failure of the task.

Effects of the Invention

According to the present technology, it is possible to prevent failure of an operation of a robot.

Note that the effects described herein are not necessarily limited, and may also be any effects described in the present disclosure.

BRIEF DESCRIPTION OF DRAWINGS

FIG. 1 is a diagram showing an example of an outline of a robot according to an embodiment of the present technology.

FIG. 24 is a block diagram showing an example configuration of a computer.

MODE FOR CARRYING OUT THE INVENTION

Figure 2:
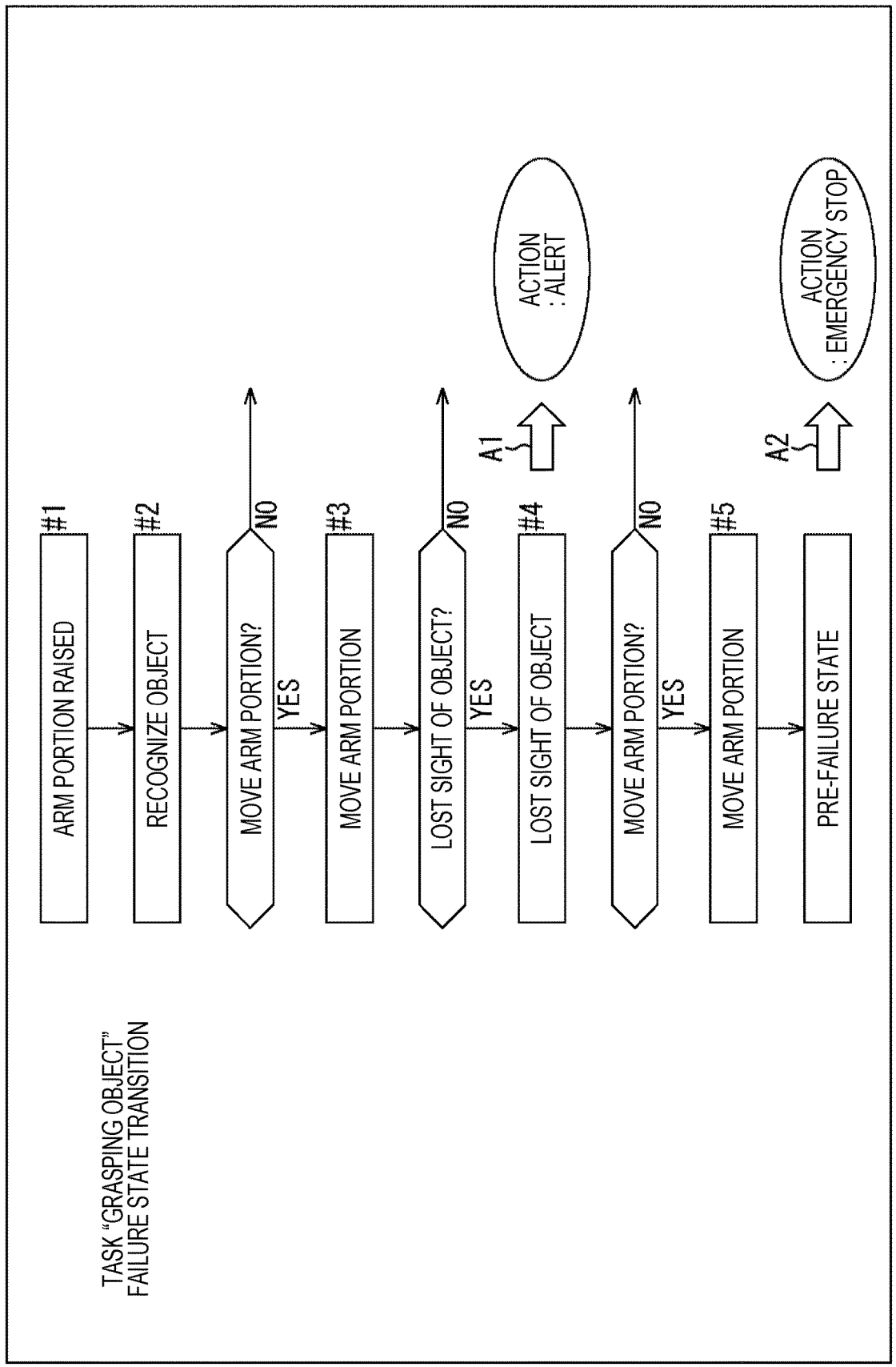
FIG. 2 is a diagram showing an example of a failure state transition.

Modes for carrying out the present technology will be described below. The description will be given in the following order.
1. Failure state transition
2. Example configuration of robot
3. Operation of robot
4. Examples of updating failure state transition
5. Examples of recovery
6. Modified examples <Failure State Transition>

FIG. 1 is a diagram showing an example of an outline of a robot according to an embodiment of the present technology.

A robot 1 shown in A of FIG. 1 is an arm-type robot. The robot 1 includes a base portion 11, an arm portion 12 extending from the base portion 11, and a hand portion 13 attached to an end of the arm portion 12. The robot 1 is provided in a factory or the like and performs a predetermined task such as grasping and moving an object.

Instead of the robot 1, a robot 2 that is a human-type robot capable of bipedal walking as shown in B of FIG. 1 may be used. The robot 2 also includes an arm portion and the like and can grasp and move an object.

The robot 1 and the robot 2 shown in FIG. 1 take autonomous actions by executing a predetermined program by a built-in computer and driving individual parts.

Processes performed in the robot 1, which is an arm-type robot, will be described below as appropriate. Processes similar to the processes performed in the robot 1 are performed by the robot 2 or a robot having another shape such as a robot capable of quadrupedal walking.

The robot 1 monitors its own state at each timing in a case of performing tasks such as grasping and moving an object. In a case where the transition of the state of the robot 1 follows the same transition as a failure state transition, which is a state transition that results in failure of a task, the robot 1 performs a predetermined action such as alerting a user before reaching the failure state.

The robot 1 has failure state transition information, which is information indicating a failure state transition for each task. The failure state transition information is generated in advance at a predetermined timing and prepared for the robot 1.

Here, states include operations and events. An operation indicates a matter that is actively performed by the robot 1. Operations include matters such as "moving an arm" and "recognizing". Furthermore, an event indicates a passive matter detected in the robot 1. Events include matters such as "losing sight". Herein, it is determined whether or not the state of the robot 1 corresponds to each state, instead of representing each state by a value.

Note that states include recognition results such as a result of recognizing an image, a result of detecting an unusual noise, and a result of detecting a smell. Furthermore, states also include recognition results such as the shape, slipperiness, and softness of an object identified by grasping the object.

FIG. 2 is a diagram showing an example of a failure state transition.

The failure state transition shown in FIG. 2 represents a state transition that results in failure of a task of "grasping an object". The task of "grasping an object" is, for example, a task of recognizing, grasping, and lifting an object placed near the robot 1.

In performing the task of "grasping an object", the state of the robot 1 first becomes a state #1, which is a state where the arm portion 12 is raised, and then becomes a state #2, which is a state where the object to be grasped is recognized. For example, the object to be grasped is recognized on the basis of an image captured by a camera or sensor data detected by a sensor.

After the state #2, which is a state where the object to be grasped is recognized, is reached, it is determined whether or not to move the arm portion 12.

In a case where it is determined to move the arm portion 12, the state of the robot 1 becomes a state #3, which is a state where the arm portion 12 is moved. In the case where the state #3 is reached, the robot 1 moves the arm portion 12 by driving individual parts. In a case where the arm portion 12 is not moved, it is regarded that the task will not result in failure.

After the state #3, which is a state where the arm portion 12 is moved, is reached, it is determined whether or not the object to be grasped is lost sight of.

In a case where it is determined that the object to be grasped is lost sight of, the state of the robot 1 becomes a state #4, which is a state where the object to be grasped is lost sight of.

In the case where the state #4 is reached, an action of alert is performed as indicated by an arrow A1 at its head. The robot 1 drives a speaker or the like to alert the user that the object to be grasped is lost sight of by means of sound. In a case where the object to be grasped is not lost sight of, it is regarded that the task will not result in failure.

After the state #4, which is a state where the object to be grasped is lost sight of, is reached and the action of alert is performed, it is determined whether or not to further move the arm portion 12.

In a case where it is determined to further move the arm portion 12, the state of the robot 1 becomes a state #5, which is a state where the arm portion 12 is moved.

In the case where the state #5 is reached, it is determined that a pre-failure state, which is a state before the task results in failure, is reached, and an action of emergency stop is performed as indicated by an arrow A2 at its head. The robot 1 stops driving individual parts and does not move the arm portion 12. As the arm portion 12 is not moved, the task will not result in failure.

In this manner, the state transition including the states #1 to #5 is set as the failure state transition for the case of performing the task of "grasping an object". In a case where the state transition of the robot 1 follows the same transition as the failure state transition, the action of alert or emergency stop is performed.

In a case where the failure state transition is followed and the arm portion 12 is to be moved even after the object to be grasped is lost sight of and the alert is performed, by becoming the pre-failure state and causing an emergency stop of the operation, the robot 1 can prevent the failure of the task and prevent the arm portion 12 or the like from hitting surrounding objects.

Figure 3:
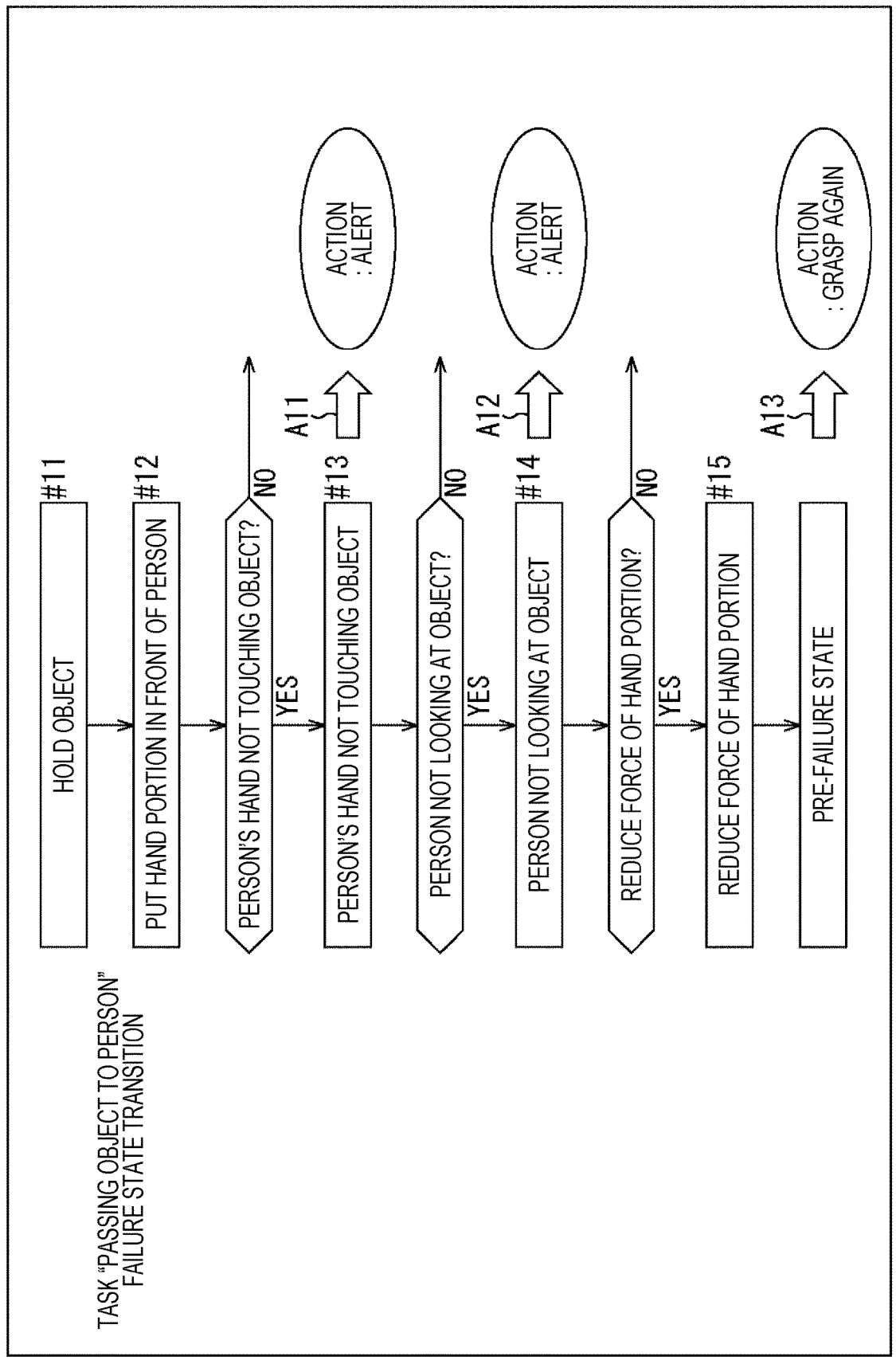
FIG. 3 is a diagram showing another example of a failure state transition.

FIG. 3 is a diagram showing another example of a failure state transition.

The failure state transition shown in FIG. 3 represents a state transition that results in failure of a task of "passing an object to a person". The task of "passing an object to a person" is, for example, a task of grasping an object placed near the robot 1 and presenting it in front of a nearby person and releasing the grasp to pass it to the person.

In performing the task of "passing an object to a person", the state of the robot 1 first becomes a state #11, which is a state where the object is held by the hand portion 13, and then becomes a state #12, which is a state where the hand portion 13 is placed in front of the person. The operation of holding the object is realized by recognizing the target object on the basis of an output of a sensor such as a camera and driving the arm portion 12 and the hand portion 13.

After the state #12, which is a state where the hand portion 13 grasping the object is placed in front of the person, it is determined whether the person's hand is not touching the object. Touching the object by the person's hand is recognized on the basis of an image captured by a camera or sensor data detected by a sensor, for example.

In a case where it is determined that the person's hand is not touching the object, the state of the robot 1 becomes a state #13, which is a state where the person's hand is not touching the object.

In the case where the state #13 is reached, an action of alert is performed as indicated by an arrow A11 at its head. The robot 1 drives a speaker or the like to alert the user that the hand is not touching the object by means of sound. In a case where the person's hand is touching the object, it is regarded that the task will not result in failure.

After the state #13, which is a state where the person's hand is not touching the object, is reached and the action of alert is performed, it is determined whether the person is not looking at the object presented by the hand portion 13. For example, whether or not the object is being looked at is determined on the basis of the line-of-sight direction of the person identified by analyzing an image captured by a camera.

In a case where it is determined that the person is not looking at the object, the state of the robot 1 becomes a state #14, which is a state where the person is not looking at the object.

In the case where the state #14 is reached, an action of alert is performed as indicated by an arrow A12 at its head. The robot 1 drives a speaker or the like to alert the user to concentrate on looking at the object by means of sound. In a case where the person is looking at the object, it is regarded that the task will not result in failure.

After the state #14, which is a state where the person is not looking at the object, is reached and the action of alert is performed, it is determined whether or not to reduce the force of the hand portion 13 grasping the object.

In a case where it is determined to reduce the force of the hand portion 13 grasping the object, the state of the robot 1 becomes the state #15, which is a state where the force of the hand portion 13 grasping the object is reduced. In a case where the force of the hand portion 13 grasping the object is not reduced, it is regarded that the task will not result in failure.

In the case where the state #15 is reached, it is determined that the pre-failure state is reached, and an action of grasping again is performed as indicated by an arrow A13 at its head. The robot 1 drives individual parts to increase the force of the hand portion 13 to grasp the object again.

In this manner, the state transition including the states #11 to #15 is set as the failure state transition for the case of performing the task of "passing an object to a person". In a case where the state transition of the robot 1 follows the same transition as the failure state transition, the action of alert or emergency stop is performed.

In a case where the failure state transition is followed and the force of the hand portion 13 is to be reduced even after the alert to look at the object is performed, by becoming the pre-failure state and performing an operation for grasping the object again, the robot 1 can prevent the failure of the task and prevent the lifted object from being dropped.

In this manner, a failure state transition is set for each task, and information indicating such a transition is prepared for the robot 1.

The robot 1 determines that the task will fail in a case where its own state transition follows the same transition as the failure state transition, and performs optimum operation according to the task before actually resulting in failure, so that the failure can be prevented.

Processes of the robot 1 for preventing the failure as described above will be described later with reference to flow charts.

<Example Configuration of Robot>

Figure 4:
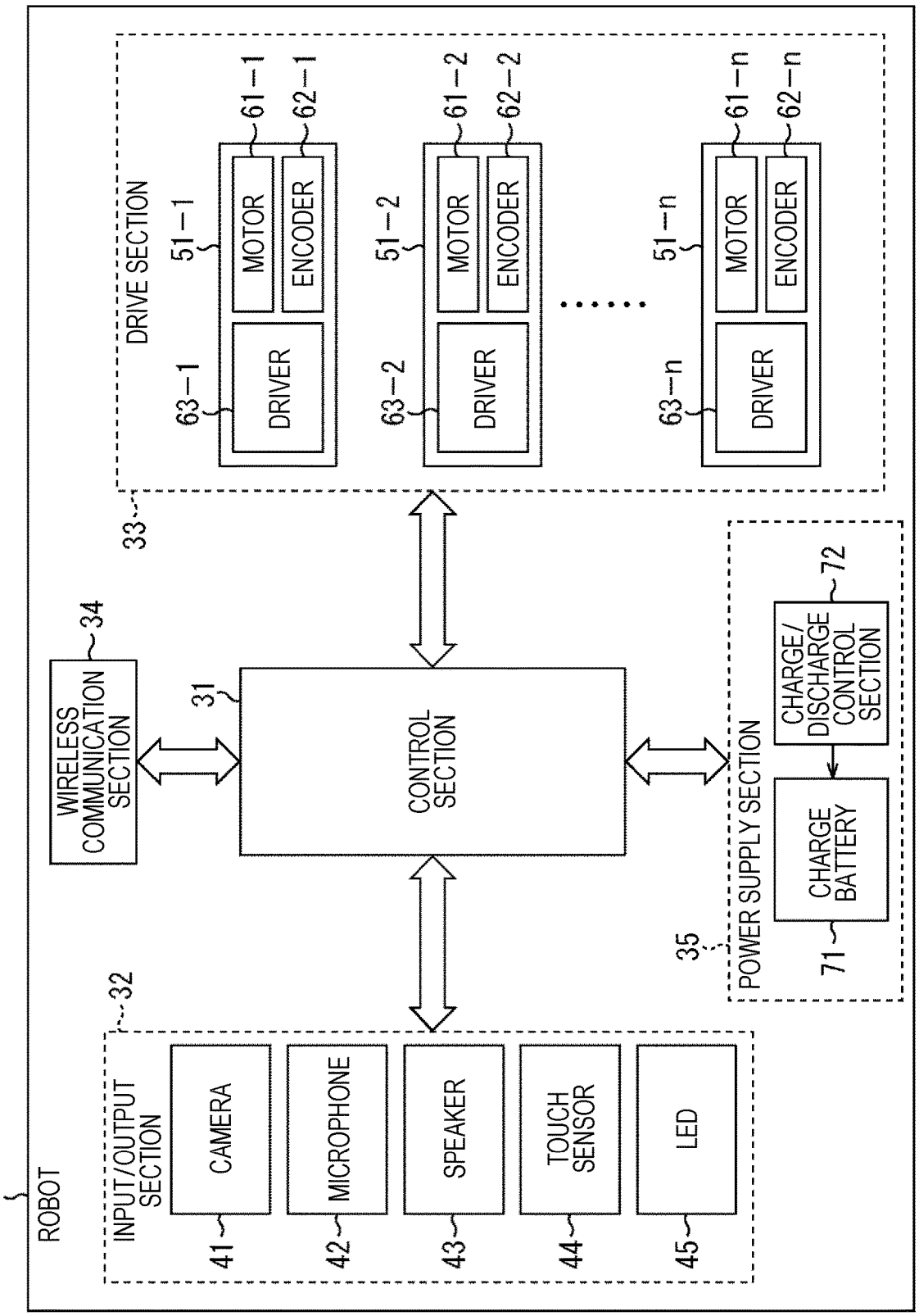
FIG. 4 is a block diagram showing an example hardware configuration of a robot.

FIG. 4 is a block diagram showing an example hardware configuration of the robot 1.

As shown in FIG. 4, the robot 1 is constituted by connecting an input/output section 32, a drive section 33, a wireless communication section 34, and a power supply section 35 to a control section 31.

The control section 31 includes a computer including a central processing unit (CPU), a read only memory (ROM), a random access memory (RAM), a flash memory, and the like. The control section 31 executes a predetermined program by the CPU to control the overall operation of the robot 1. The computer constituting the control section 31 functions as a control device that controls the operation of the robot 1.

For example, the control section 31 monitors its own state on the basis of information supplied from the input/output section 32 and information supplied from each drive unit of the drive section 33.

Furthermore, in a case of performing a predetermined task, the control section 31 determines whether or not its own state transition follows the same transition as a failure state transition on the basis of failure state transition information for the task. In a case where it is determined that its own state transition follows the same transition as the failure state transition, the control section 31 performs a predetermined action before actually resulting in failure.

The input/output section 32 includes a camera 41, a mic (microphone) 42, a speaker 43, a touch sensor 44, and a light emitting diode (LED) 45.

The camera 41 sequentially captures images of the surrounding environment. The camera 41 outputs data of captured images, which are still or moving images obtained by the image capture, to the control section 31.

The mic 42 detects environmental sounds. The mic 42 outputs data of the environmental sounds to the control section 31.

The speaker 43 outputs predetermined sounds such as speech sounds and BGM.

The touch sensor 44 is provided at a predetermined portion such as the base portion 11. The touch sensor 44 detects a touch by the user and outputs information indicating the content of an operation by the user to the control section 31.

The LED 45 emits light according to control by the control section 31 to present information to the user. Instead of the LED 45, a small display such as an LCD or an organic EL display may be provided.

The input/output section 32 is provided with various modules such as a distance measurement sensor that measures the distance to a surrounding object and a position measurement sensor such as a global positioning system (GPS).

The drive section 33 is driven according to control by the control section 31 to realize actions of the robot 1. The drive section 33 includes a plurality of drive units provided for respective joint axes such as roll, pitch, and yaw.

Each drive unit is provided to a respective joint of the robot 1, for example. Each drive unit includes a combination of a motor that rotates about an axis, an encoder that detects the rotational position of the motor, and a driver that adaptively controls the rotational position and rotational speed of the motor on the basis of an output of the encoder. The hardware configuration of the robot 1 is determined by the number of drive units, the positions of the drive units, and the like.

In the example of FIG. 4, drive units 51-1 to 51-$n$ are provided as the drive units. For example, the drive unit 51-1 includes a motor 61-1, an encoder 62-1, and a driver 63-1. The drive units 51-2 to 51-$n$ have configurations similar to that of the drive unit 51-1.

The wireless communication section 34 is a wireless communication module such as a wireless LAN module, a mobile communication module capable of Long Term Evolution (LTE). The wireless communication section 34 communicates with an external device such as a server on the Internet. The wireless communication section 34 sends data supplied from the control section 31 to the external device and receives data sent from the external device.

The power supply section 35 supplies electric power to individual parts in the robot 1. The power supply section 35 includes a charge battery 71 and a charge/discharge control section 72 that manages the charge/discharge state of the charge battery 71.

Figure 5:
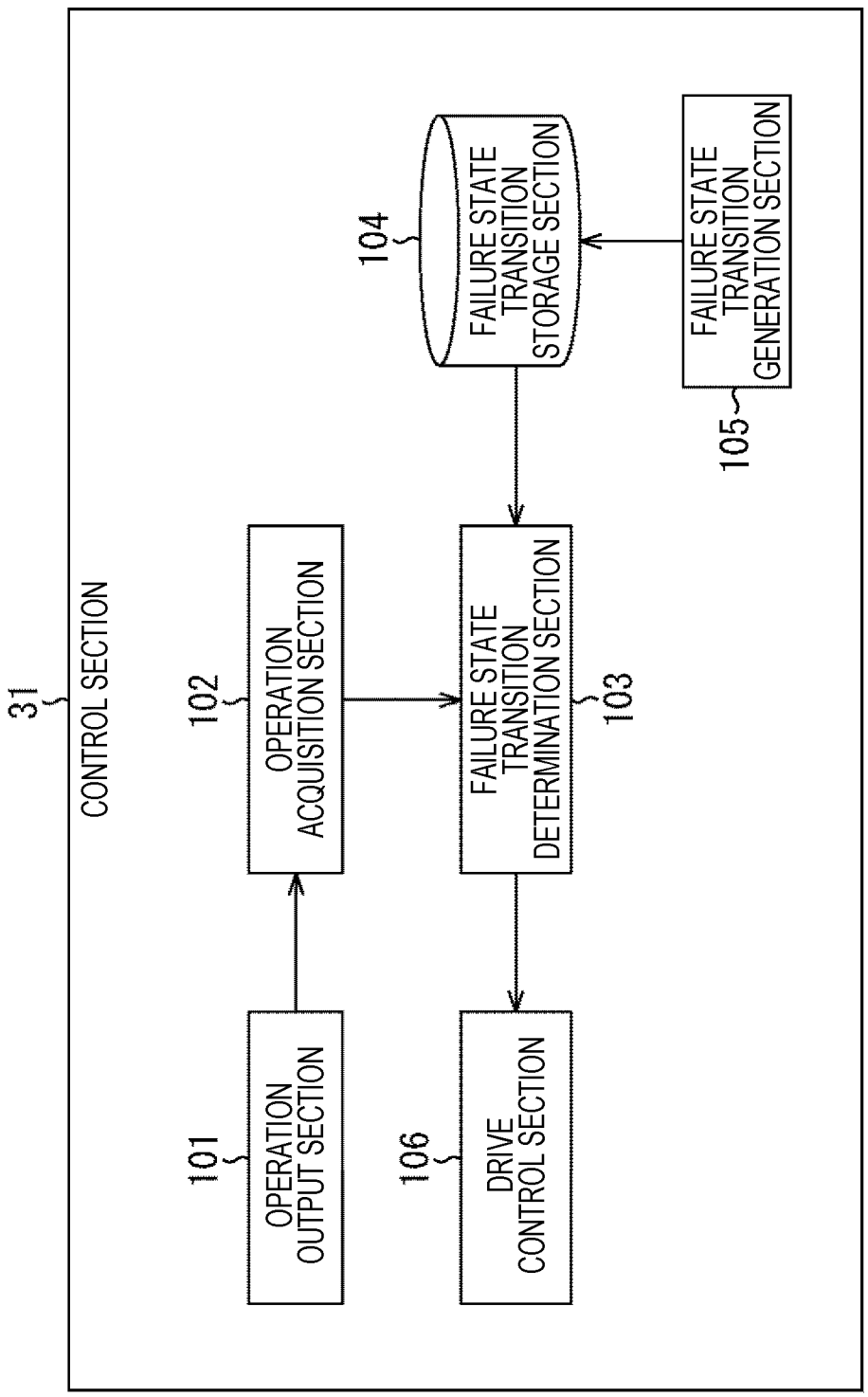
FIG. 5 is a block diagram showing an example functional configuration of a control section.

FIG. 5 is a block diagram showing an example functional configuration of the control section 31.

As shown in FIG. 5, the control section 31 includes an operation output section 101, an operation acquisition section 102, a failure state transition determination section 103, a failure state transition storage section 104, a failure state transition generation section 105, and a drive control section 106. At least part of the functional sections shown in FIG. 5 is realized by the execution of a predetermined program by the CPU constituting the control section 31.

The operation output section 101 receives information supplied from each drive unit of the drive section 33 and outputs it to the operation acquisition section 102.

The operation acquisition section 102 detects the content of an operation of the robot 1 on the basis of the information supplied from the operation output section 101. The operation acquisition section 102 outputs information indicating the content of the operation to the failure state transition determination section 103.

In a case of performing a predetermined task, the failure state transition determination section 103 reads and acquires information indicating the failure state transition for the task to be performed from the failure state transition storage section 104.

The failure state transition determination section 103 identifies the state of the robot 1 on the basis of the operation indicated by the information supplied from the operation acquisition section 102, and determines whether or not its own state transition follows the same transition as the failure state transition.

The failure state transition determination section 103 controls the drive control section 106 on the basis of a result of the determination on the state transition. For example, in a case of determining that its own state transition does not follow the same transition as the failure state transition, the failure state transition determination section 103 causes each operation leading to the success of the task to be performed. Furthermore, in a case of determining that its own state transition follows the same transition as the failure state transition, the failure state transition determination section 103 causes a preset action to be performed.

The failure state transition storage section 104 stores the failure state transition information of each task.

The failure state transition generation section 105 sets the failure state transition of each task and generates the failure state transition information. The failure state transition generation section 105 outputs the failure state transition information to the failure state transition storage section 104 for storage.

The drive control section 106 controls each drive unit of the drive section 33 to perform a predetermined operation on the basis of the information supplied from the failure state transition determination section 103.

<Operation of Robot>

Here, the operation of the robot 1 having the above configuration will be described.

Figure 6:
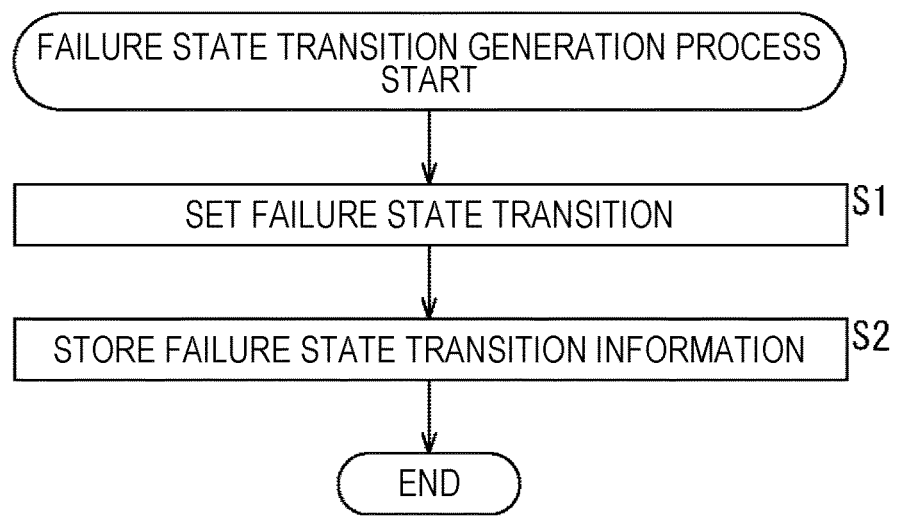
FIG. 6 is a flow chart illustrating a failure state transition generation process.

First, a failure state transition generation process of the robot 1 will be described with reference to the flow chart of FIG. 6.

In step S1, the failure state transition generation section 105 sets a failure state transition for a predetermined task. The setting of the failure state transition may also be performed according to an operation of a manager of the robot 1, for example.

In step S2, the failure state transition generation section 105 outputs failure state transition information to the failure state transition storage section 104 for storage.

The above process is performed for each task. The failure state transition storage section 104 stores the failure state transition information for each task.

Figure 7:
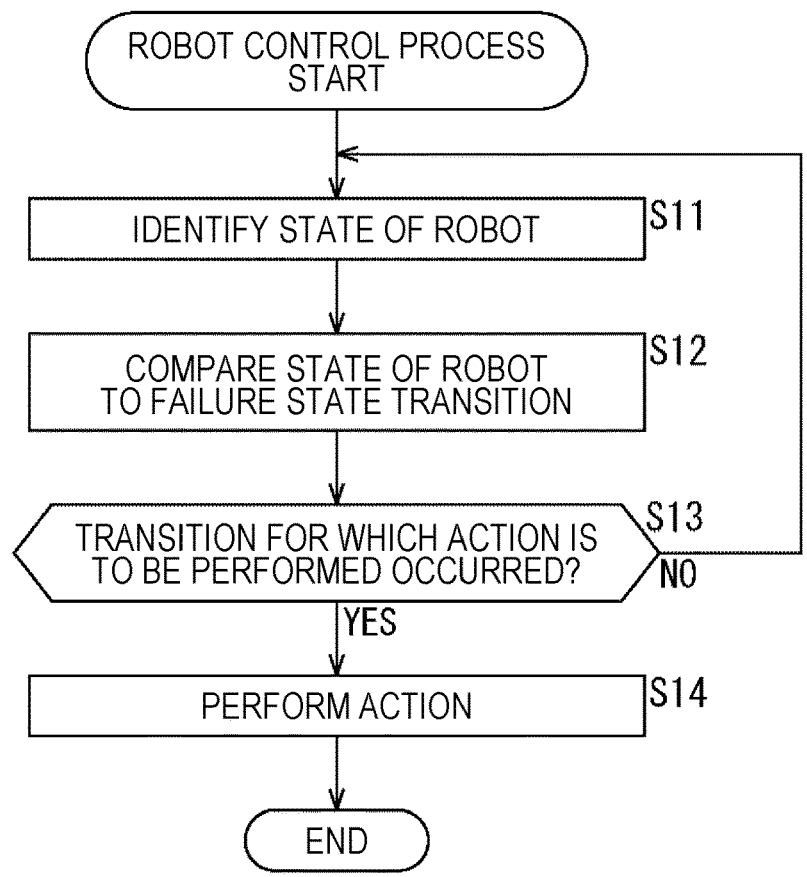
FIG. 7 is a flow chart illustrating a control process.

Next, a control process of the robot 1 will be described with reference to the flow chart of FIG. 7.

In step S11, the failure state transition determination section 103 identifies the state of the robot 1 on the basis of an operation indicated by information supplied from the operation acquisition section 102. Information indicating how the robot 1 moves (such as moving the arm portion 12 upward or moving forward), what information the robot 1 obtains (such as results of image/sound recognition and any other sensor information), and the like is supplied from the operation acquisition section 102 as information indicating the content of the operation.

In step S12, the failure state transition determination section 103 compares the state of the robot 1 to the failure state transition.

In step S13, the failure state transition determination section 103 determines whether or not the state transition of the robot 1 follows the same transition as the failure state transition and a transition for which an action is to be performed has occurred.

In a case where it is determined that a transition for which an action is to be performed has not occurred in step S13, the failure state transition determination section 103 returns to step S11 and repeats the above-described process.

In a case where it is determined that a transition for which an action is to be performed has occurred in step S13, in step S14, the failure state transition determination section 103 controls the drive control section 106 to perform a predetermined action. As described above, an action such as an alert to the user, an emergency stop of the operation, or grasping again is performed according to the state of the robot 1.

After the action is performed, the process ends. The above process is repeatedly performed during the task.

As described above, the robot 1 performs an optimum operation before a task fails and can thereby prevent the failure of the task.

<Examples of Updating Failure State Transition>

The failure state transition may be automatically updated by the robot 1. For example, the update of the failure state transition is performed in a case where the pre-failure state is reached a large number of times.

Update Example 1

Figure 8:
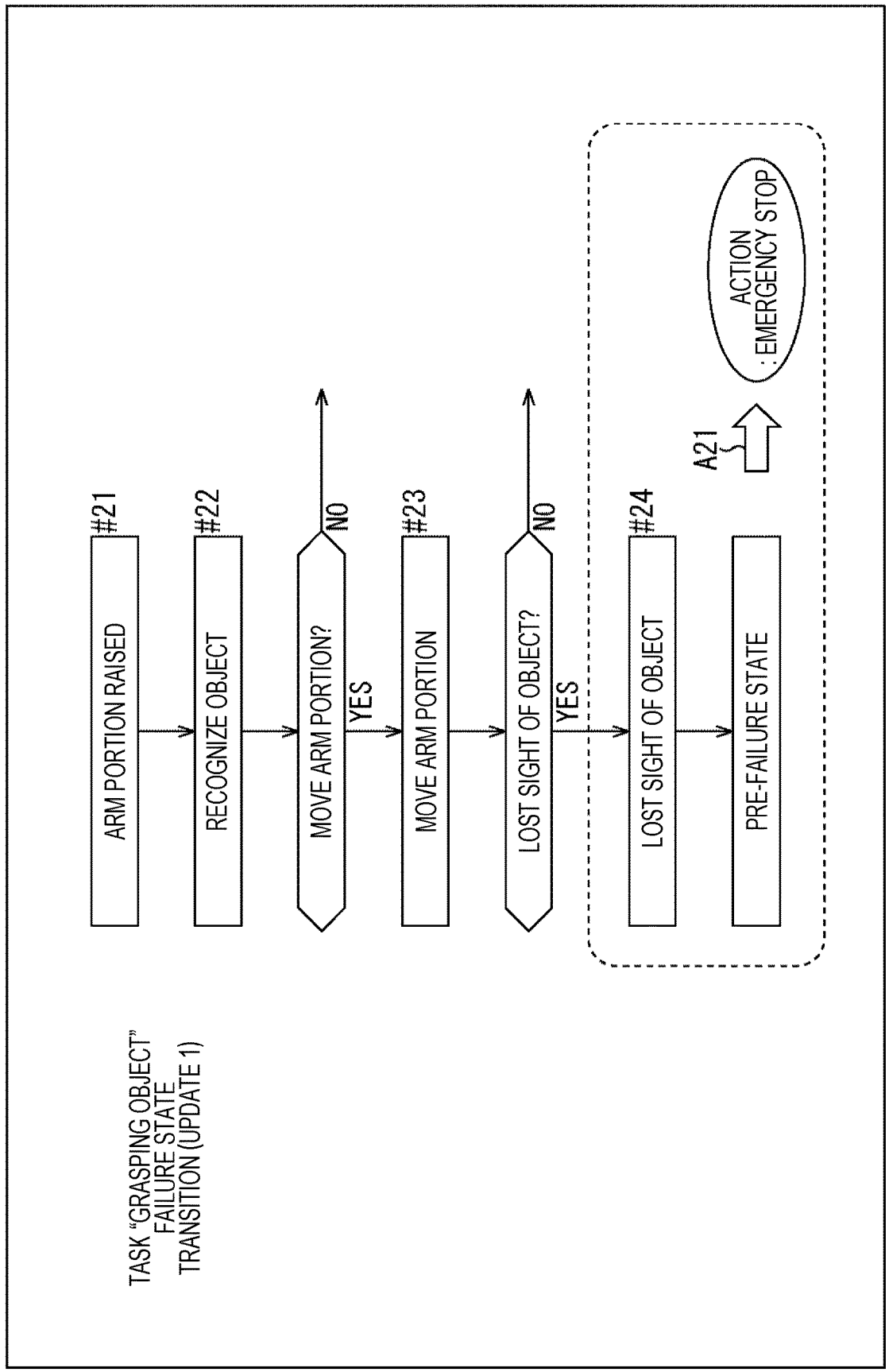
FIG. 8 is a diagram showing a first example of updating a failure state transition for a task of "grasping an object".

FIG. 8 is a diagram showing a first example of updating a failure state transition for a task of "grasping an object".

States #21 to #23 in FIG. 8 are similar to the states #1 to #3 in FIG. 2. After a state #23, which is a state where the arm portion 12 is moved, is reached, it is determined whether or not the object to be grasped is lost sight of.

In a case where it is determined that the object to be grasped is lost sight of, the state of the robot 1 becomes a state #24, which is a state where the object to be grasped is lost sight of.

In the case where the state #24 is reached, an action of emergency stop is performed as indicated by an arrow A21 at its head. The robot 1 stops driving individual parts and does not move the arm portion 12.

That is, in the failure state transition of FIG. 8, as shown in the region enclosed by a broken line, in a case where the state #24, which is a state where the object to be grasped is lost sight of, is reached, it is determined that the pre-failure state is reached and the action of emergency stop is performed without alerting the user. In other words, the failure state transition is updated such that the pre-failure state is more likely to be reached.

As the failure state transition is updated such that it is determined that the pre-failure state is reached early, it is possible to more reliably prevent the failure of the task.

Update Example 2

Figure 9:
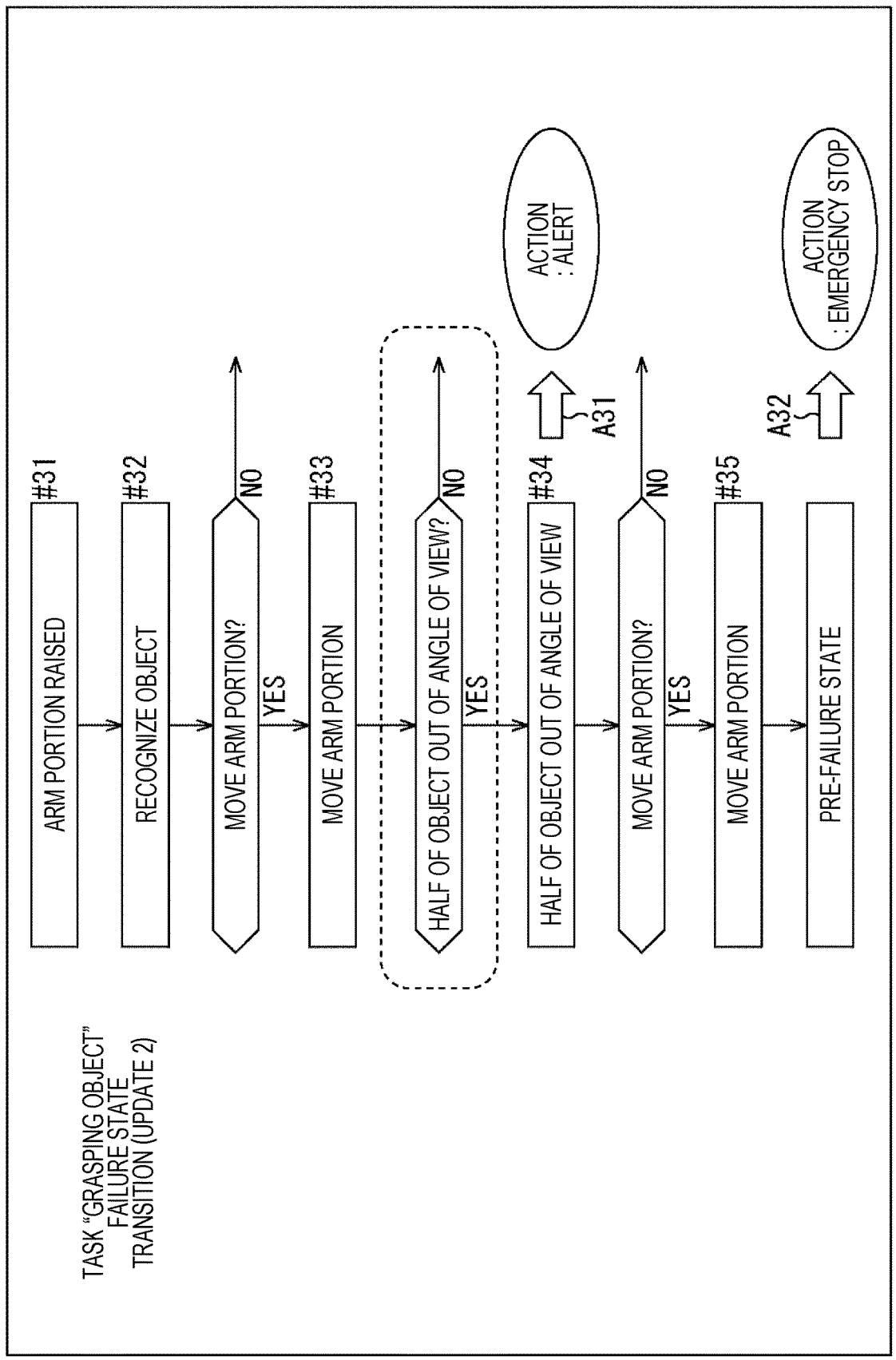
FIG. 9 is a diagram showing a second example of updating a failure state transition for a task of "grasping an object".

FIG. 9 is a diagram showing a second example of updating a failure state transition for a task of "grasping an object".

States #31 to #33 in FIG. 9 are similar to the states #1 to #3 in FIG. 2. After a state #33, which is a state where the arm portion 12 is moved, is reached, it is determined whether or not half or more of the object to be grasped is out of the angle of view.

In a case where it is determined that half or more of the object to be grasped is out of the angle of view, the state of the robot 1 becomes a state #34, which is a state where half or more of the object to be grasped is out of the angle of view.

In the case where the state #34 is reached, an action of alert is performed as indicated by an arrow A31 at its head. The robot 1 drives a speaker or the like to alert the user that half or more of the object to be grasped is out of the angle of view by means of sound.

That is, in the failure state transition of FIG. 9, as shown in the region enclosed by a broken line, the action of alert is performed on the basis of a criterion that is stricter than a criterion in the transition of FIG. 2.

In the failure state transition of FIG. 2, the action of alert is performed in a case where the object to be grasped, for example the entire portion thereof, is out of the angle of view, and it is determined that the object is lost sight of. Since the state where half of the object to be grasped is out of the angle of view is a state that is more likely to occur than the state where the entire object is out of the angle of view, the criterion for performing the action of alert is stricter in the failure state transition of FIG. 9. In other words, the failure state transition is updated such that the failure state transition is more likely to be followed.

In the failure state transition of FIG. 9, the transition after the action of alert is performed is similar to the transition described with reference to FIG. 2.

As the failure state transition is updated such that the criterion for performing an action is stricter, it is possible to more reliably prevent the failure of the task.

Update Example 3

Figure 10:
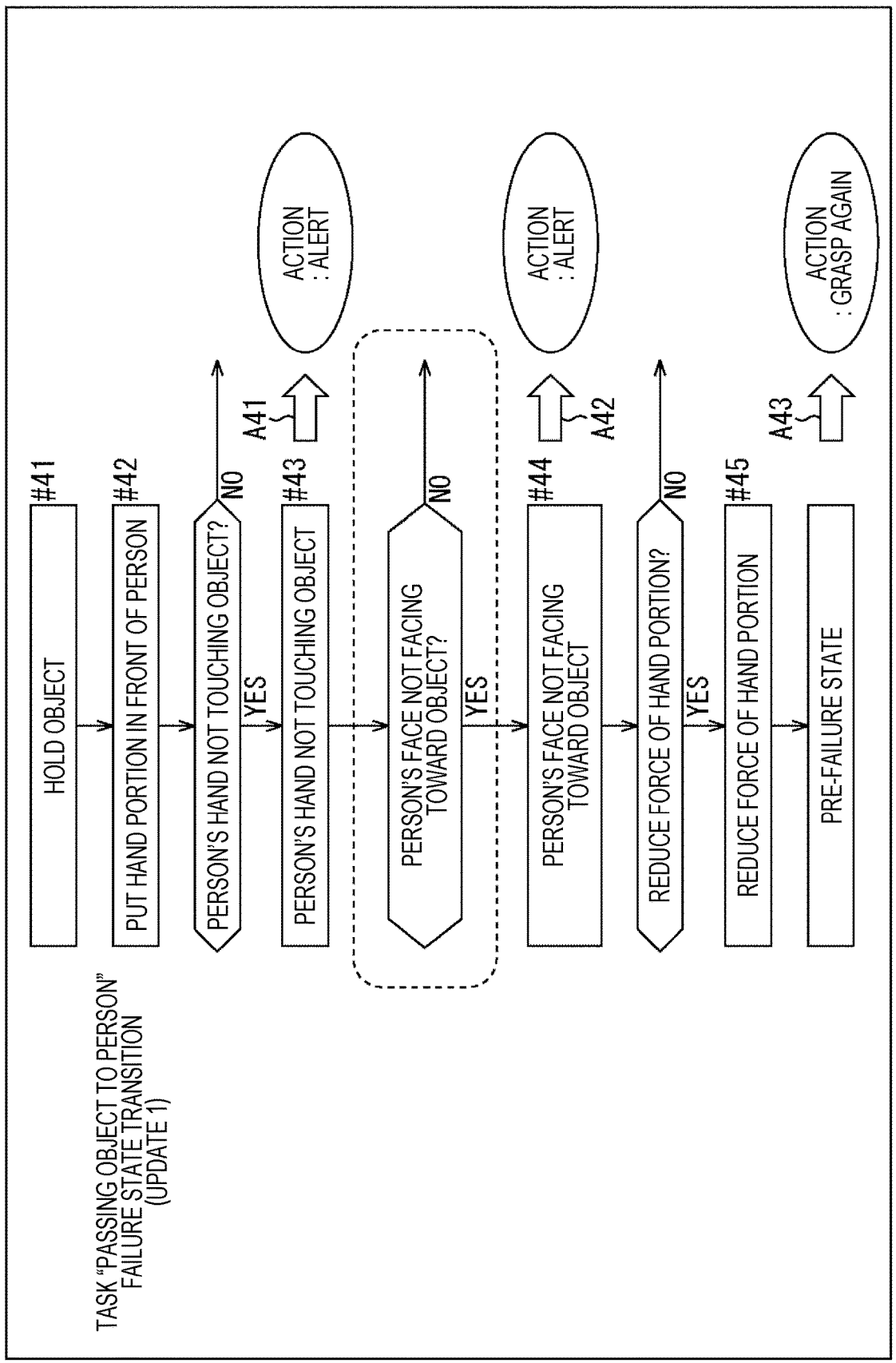
FIG. 10 is a diagram showing a first example of updating a failure state transition for a task of "passing an object to a person".

FIG. 10 is a diagram showing a first example of updating a failure state transition for a task of "passing an object to a person".

States #41 to #43 in FIG. 10 are similar to the states #11 to #13 in FIG. 3. In the case where a state #43, which is a state where the person's hand is not touching the object, is reached, an action of alert is performed as indicated by an arrow A41 at its head.

After the state #43, which is a state where the person's hand is not touching the object, is reached and the action of alert is performed, it is determined whether the person's face is not facing toward the object.

In a case where it is determined that the person's face is not facing toward the object, the state of the robot 1 becomes a state #44, which is a state where the person's face is not facing toward the object. In the case where the state #44 is reached, an action of alert is performed as indicated by an arrow A42 at its head.

That is, in the failure state transition of FIG. 10, as shown in the region enclosed by a broken line, the action of alert is performed on the basis of a criterion that is stricter than a criterion in the transition of FIG. 3.

In the failure state transition of FIG. 3, the action of alert is performed in a case where it is determined that the person is not looking at the object. In other words, the action of alert is not performed as long the line-of-sight is directed to the object, regardless of the face direction.

Since a criterion that requires more attention of the person is used in that not only the line-of-sight but also the face direction is taken in consideration, it can be regarded that the failure state transition of FIG. 10 is a transition that uses a stricter criterion for performing the action of alert.

In the failure state transition of FIG. 10, the transition after the action of alert is performed is similar to the transition described with reference to FIG. 3.

Update Example 4

Figure 11:
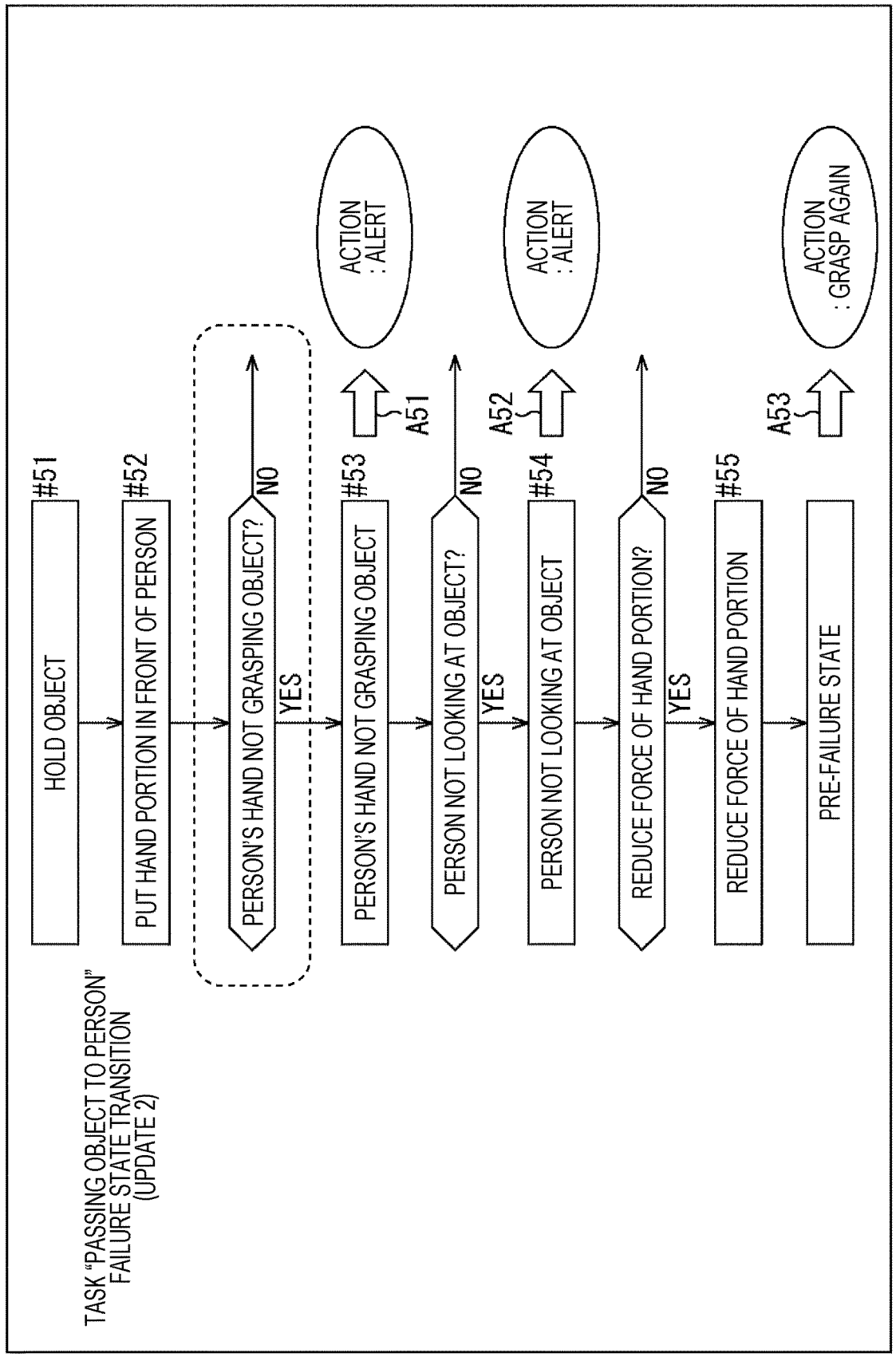
FIG. 11 is a diagram showing a second example of updating a failure state transition for a task of "passing an object to a person".

FIG. 11 is a diagram showing a second example of updating a failure state transition for a task of "passing an object to a person".

States #51 and #52 in FIG. 11 are similar to the states #11 and #12 in FIG. 3. After the state #12, which is a state where the hand portion 13 grasping the object is placed in front of the person, it is determined whether the person's hand is not grasping the object.

In a case where it is determined that the person's hand is not grasping the object, the state of the robot 1 becomes a state #53, which is a state where the person's hand is not grasping the object. In the case where the state #53 is reached, an action of alert is performed as indicated by an arrow A51 at its head.

That is, in the failure state transition of FIG. 11, as shown in the region enclosed by a broken line, the action of alert is performed on the basis of a criterion that is stricter than a criterion in the transition of FIG. 3.

In the failure state transition of FIG. 3, the action of alert is performed in a case where it is determined that the person's hand is not touching the object. In other words, the action of alert is not performed as long the hand is touching, not necessarily grasping, the object.

Since the criterion requires more attention of the person in that the object is not only touched but actually grasped, it can be regarded that the failure state transition of FIG. 10 is a transition that uses a stricter criterion for performing the action of alert.

In the failure state transition of FIG. 11, the transition after the action of alert is performed is similar to the transition described with reference to FIG. 3.

Update Example 5

Figure 12:
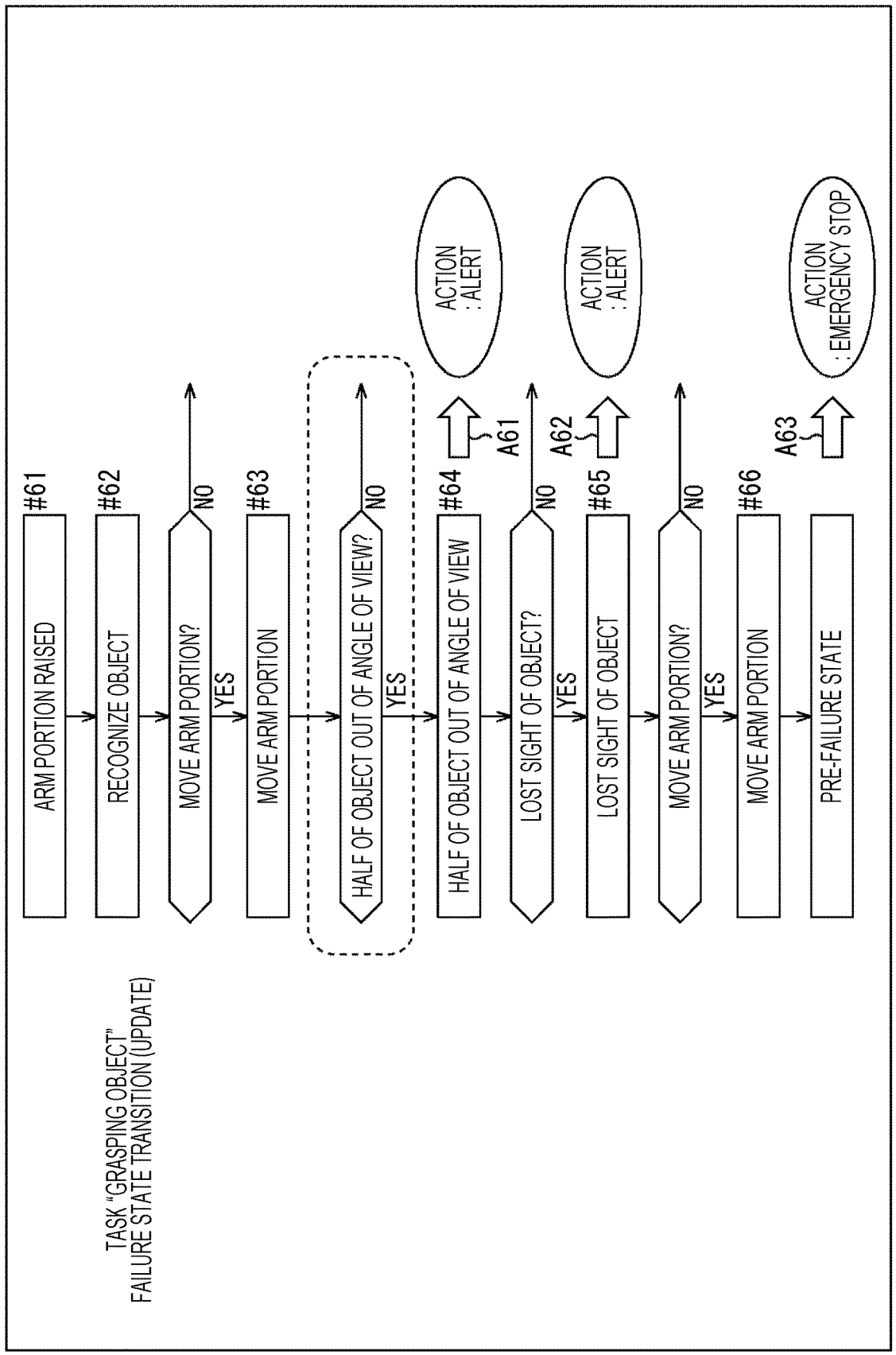
FIG. 12 is a diagram showing another example of updating a failure state transition for a task of "grasping an object".

FIG. 12 is a diagram showing another example of updating a failure state transition for a task of "grasping an object".

The failure state transition shown in FIG. 12 is different from the failure state transition of FIG. 2 in that a state where an action of alert is to be performed is added.

States #61 and #62 in FIG. 12 are similar to the states #1 and #2 in FIG. 2. After a state #63, which is a state where the arm portion 12 is moved, is reached, it is determined whether or not half or more of the object to be grasped is out of the angle of view.

In a case where it is determined that half or more of the object to be grasped is out of the angle of view, the state of the robot 1 becomes a state #64, which is a state where half or more of the object to be grasped is out of the angle of view.

In the case where the state #64 is reached, an action of alert is performed as indicated by an arrow A61 at its head.

That is, in the failure state transition of FIG. 12, as show in the region enclosed by a broken line, the determination of whether or not a state for which the action of alert is to be performed is reached is added, and the action of alert is more likely to be performed than in the transition of FIG. 9.

The transition after the action of alert is performed is similar to the transition after the state #3 in FIG. 2.

Thus, as the failure state transition is updated so as to increase the number of states for which an action of alert is to be performed, it is also possible to more reliably prevent the failure of the task.

Example Configuration of Failure State Transition Update Section

Figure 13:
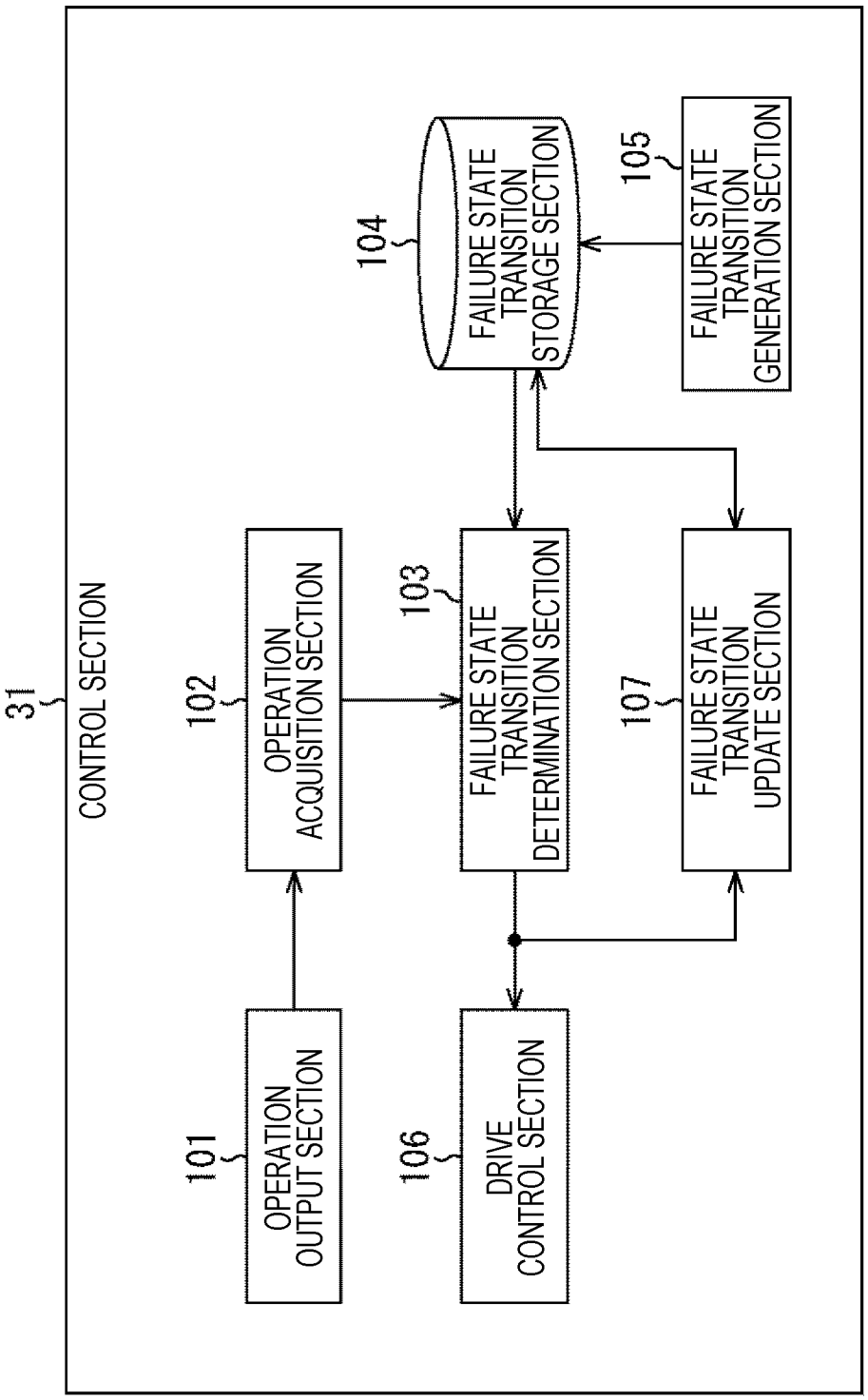
FIG. 13 is a block diagram showing another example functional configuration of the control section.

FIG. 13 is a block diagram showing another example functional configuration of the control section 31.

The configuration shown in FIG. 13 is basically the same as the configuration shown in FIG. 5 except that a failure state transition update section 107 is added. Overlapping descriptions will be omitted as appropriate.

The failure state transition update section 107 updates the failure state transition in the above-described manner in a case where it is determined that a timing for updating the failure state transition is reached. Whether or not the timing for updating the failure state transition is reached is determined on the basis of information supplied from the failure state transition determination section 103.

The failure state transition update section 107 outputs failure state transition information indicating an updated failure state transition to the failure state transition storage section 104 for storage.

Figure 14:
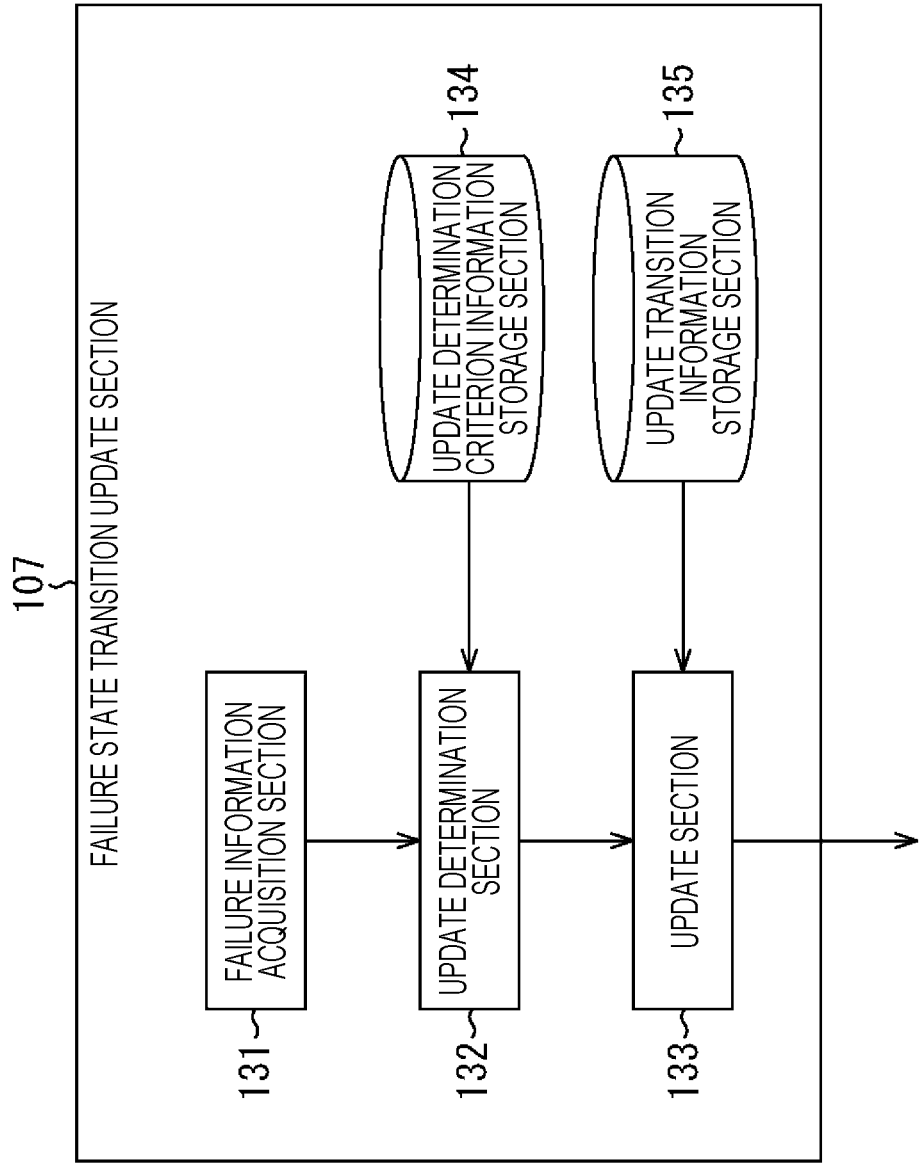
FIG. 14 is a block diagram showing an example configuration of a failure state transition update section.

FIG. 14 is a block diagram showing an example configuration of the failure state transition update section 107.

As shown in FIG. 14, the failure state transition update section 107 includes a failure information acquisition section 131, an update determination section 132, an update section 133, an update determination criterion information storage section 134, and an update transition information storage section 135.

The failure information acquisition section 131 acquires information regarding failure of a task on the basis of information output from the failure state transition determination section 103 (FIG. 13). For example, the failure information acquisition section 131 identifies the number of times the pre-failure state is reached, and outputs information indicating the identified number of times to the update determination section 132.

The update determination section 132 determines whether or not to update the failure state transition on the basis of the information supplied from the failure information acquisition section 131. The update determination criterion information storage section 134 stores update determination criterion information that is a criterion for determination on an update for each task.

Whether or not to update the failure state transition is performed by, for example, comparing the number of times the pre-failure state is reached and a threshold number of times indicated by the update determination criterion information. In a case where the number of times the pre-failure state is reached for a predetermined task exceeds the threshold number of times, the update determination section 132 determines to update the failure state transition for the task, and outputs information indicating that to the update section 133.

The update section 133 updates the failure state transition determined to be updated on the basis of information stored in the update transition information storage section 135. The update transition information storage section 135 stores information regarding how to update the failure state transition. The update section 133 outputs failure state transition information indicating the updated failure state transition to the failure state transition storage section 104 for storage.

Failure State Transition Update Process

Figure 15:
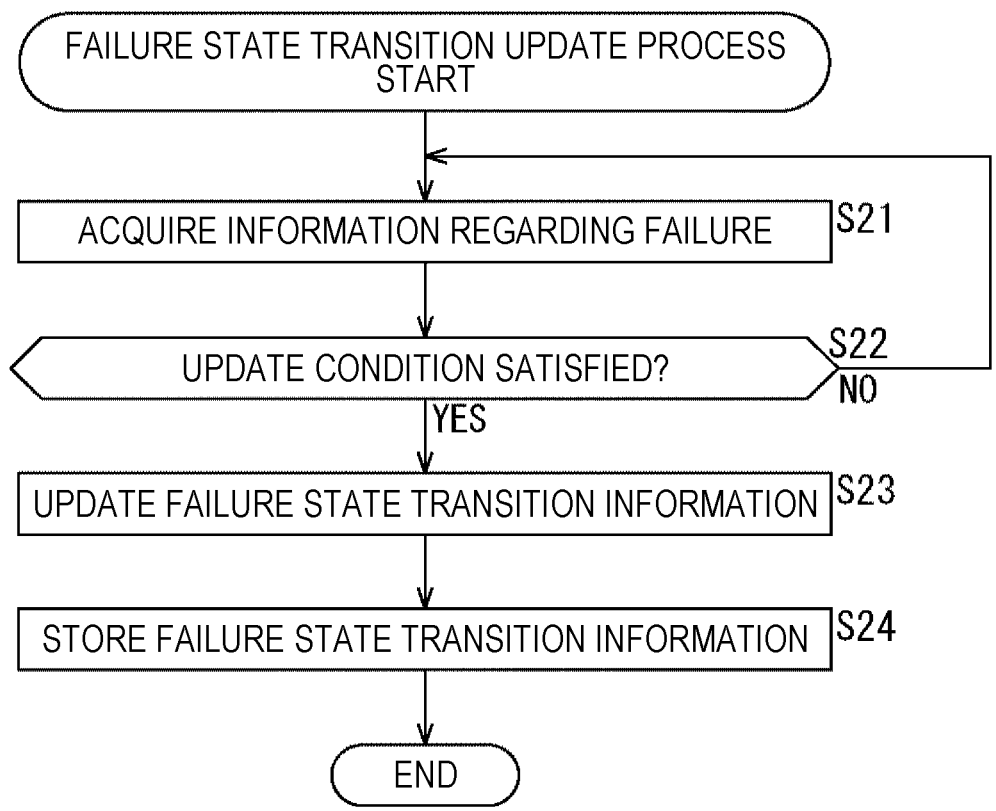
FIG. 15 is a flow chart illustrating a failure state transition update process.

A process of updating a failure state transition by the robot 1 will be described with reference to the flow chart of FIG. 15.

In step S21, the failure information acquisition section 131 acquires information regarding failure of a task on the basis of information output from the failure state transition determination section 103.

For example, the failure information acquisition section 131 acquires the number of times the pre-failure state is reached, the content of the failure, and the degree of seriousness of the failure as the information regarding the failure.

The content of the failure is a cause of an action described above. For example, that the object is lost sight of, that the person's hand is not touching the object, that the person is not looking at the object, that half of the object is out of the angle of view, that the person's face is not facing toward the object, that the person's hand is not grasping the object, or the like is acquired as the content of the failure.

Furthermore, the degree of seriousness of the failure is a degree of seriousness of reaching the pre-failure state. For example, the degree of seriousness corresponding to the pre-failure state is acquired, such as whether or not hitting occurs, whether or not the object is dropped, whether or not the object, a wall, or the like is broken, whether or not movement to a limit of the drive region occurs, or whether or not a person is nearby.

In step S22, the update determination section 132 determines whether or not a condition for updating the failure state transition is satisfied.

Here, for example, it is determined that the update condition is satisfied in a case where the number of times the pre-failure state is reached becomes greater than or equal to a threshold number of times.

Furthermore, it is also determined that the update condition is satisfied in a case where failure of the same content is repeated a threshold number of times or more or a case where a failure with a degree of seriousness greater than a threshold degree occurs.

In a case where it is determined that the update condition is not satisfied in step S22, a return to step S21 occurs, and the above process is repeated.

In a case where it is determined that the update condition is satisfied in step S22, in step S23, the update section 133 updates the failure state transition. The update of the failure state transition is performed as in 1 to 3 below, for example.

1. According to pre-setting, update is performed such that it is determined early that the pre-failure state is reached or such that the criterion for performing an action becomes a stricter criterion as described above.

For example, update is performed such that it is determined early that the pre-failure state is reached in a case where the number of times the pre-failure state is reached becomes greater than or equal to the threshold number of times. Furthermore, update is performed such that the criterion for performing an action becomes a stricter criterion in a case where failure of the same content is repeated a threshold number of times or more or a case where a failure with a degree of seriousness greater than a threshold degree occurs.

2. Update is performed so as to change the failure state transition used according to conditions.

For example, the failure state transition used is switched according to the size of the object to be grasped, such as using the failure state transition in FIG. 8 in a case where the size of the object to be grasped is smaller than a predetermined size and using the failure state transition in FIG. 9 in a case where it is larger than the predetermined size.

Furthermore, the failure state transition used is switched according to an attribute of the person to which the object is to be passed, such as using the failure state transition in FIG. 10 in a case where the person to which the object is to be passed is a child and using the failure state transition in FIG. 11 in a case where it is an adult.

3. Update is performed according to user setting.

In this case, the user is prompted to update the condition such as by outputting a sound from the speaker 43.

In step S24, the update section 133 causes the failure state transition storage section 104 to store failure state transition information indicating the updated failure state transition, and ends the process.

Thus, by updating the failure state transition in a case where the condition is satisfied, the robot 1 can more reliably prevent the failure of the task.

<Examples of Recovery>

A recovery may be performed in a case where a pre-failure state is reached. The recovery is an operation of attempting to perform a task again.

Recovery Example 1

Figure 16:
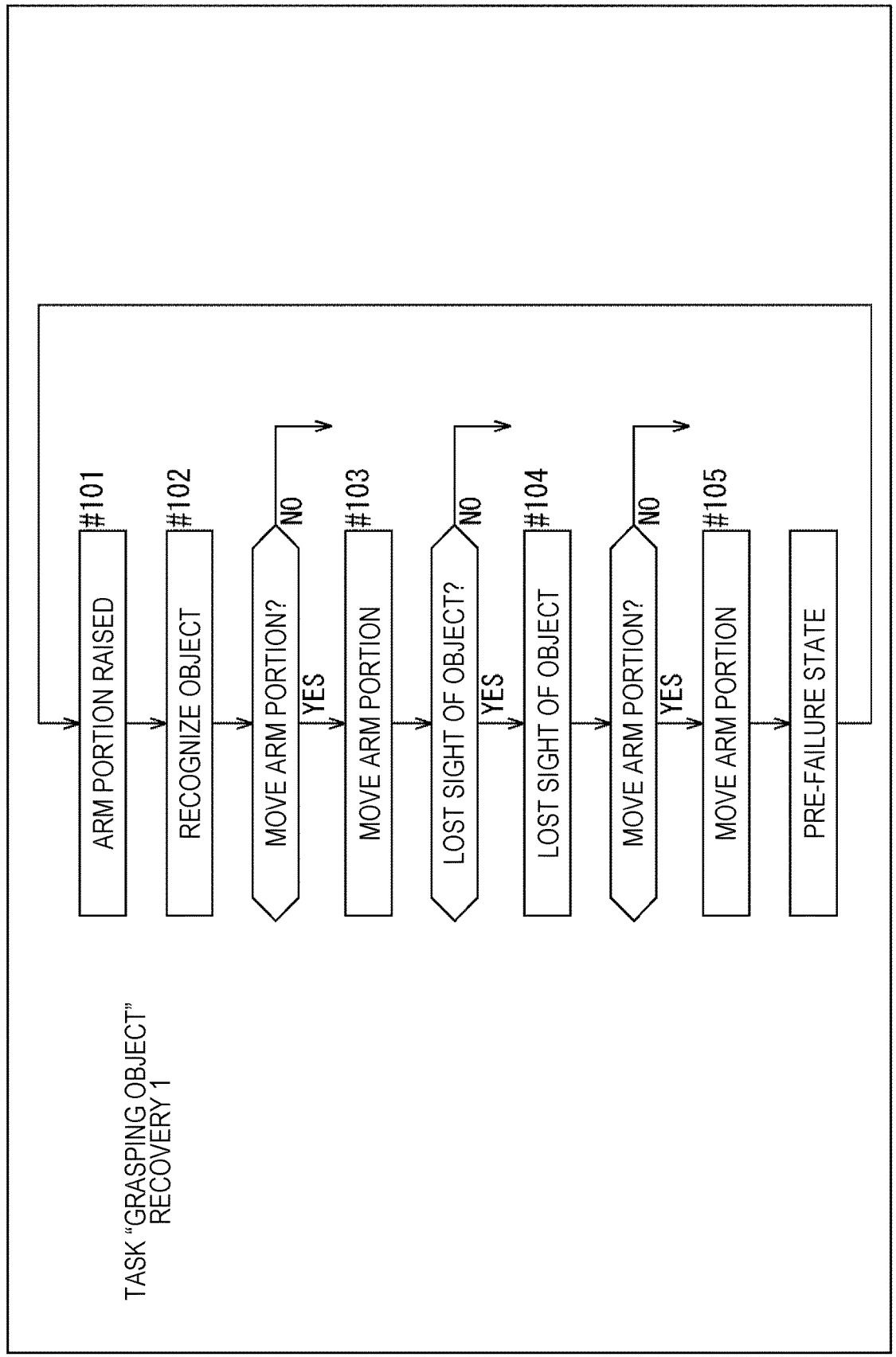
FIG. 16 is a diagram showing a first example of a failure state transition including a recovery for a task of "grasping an object".

FIG. 16 is a diagram showing a first example of a failure state transition including a recovery for a task of "grasping an object".

States #101 to #105 in FIG. 16 are similar to the states #1 to #5 in FIG. 2, respectively.

In the example of FIG. 16, in a case where the state #105, which is a state where the arm portion 12 is moved, is reached and it is determined that a pre-failure state is reached, the state of the robot 1 returns to the state #101 again.

That is, in a case of moving the arm portion 12 with the object being lost sight of, the robot 1 controls individual parts to reach a state where the arm portion 12 is raised. In the example of FIG. 16, a recovery is performed by an operation of controlling individual parts to reach a state where the arm portion 12 is raised.

Recovery Example 2

Figure 17:
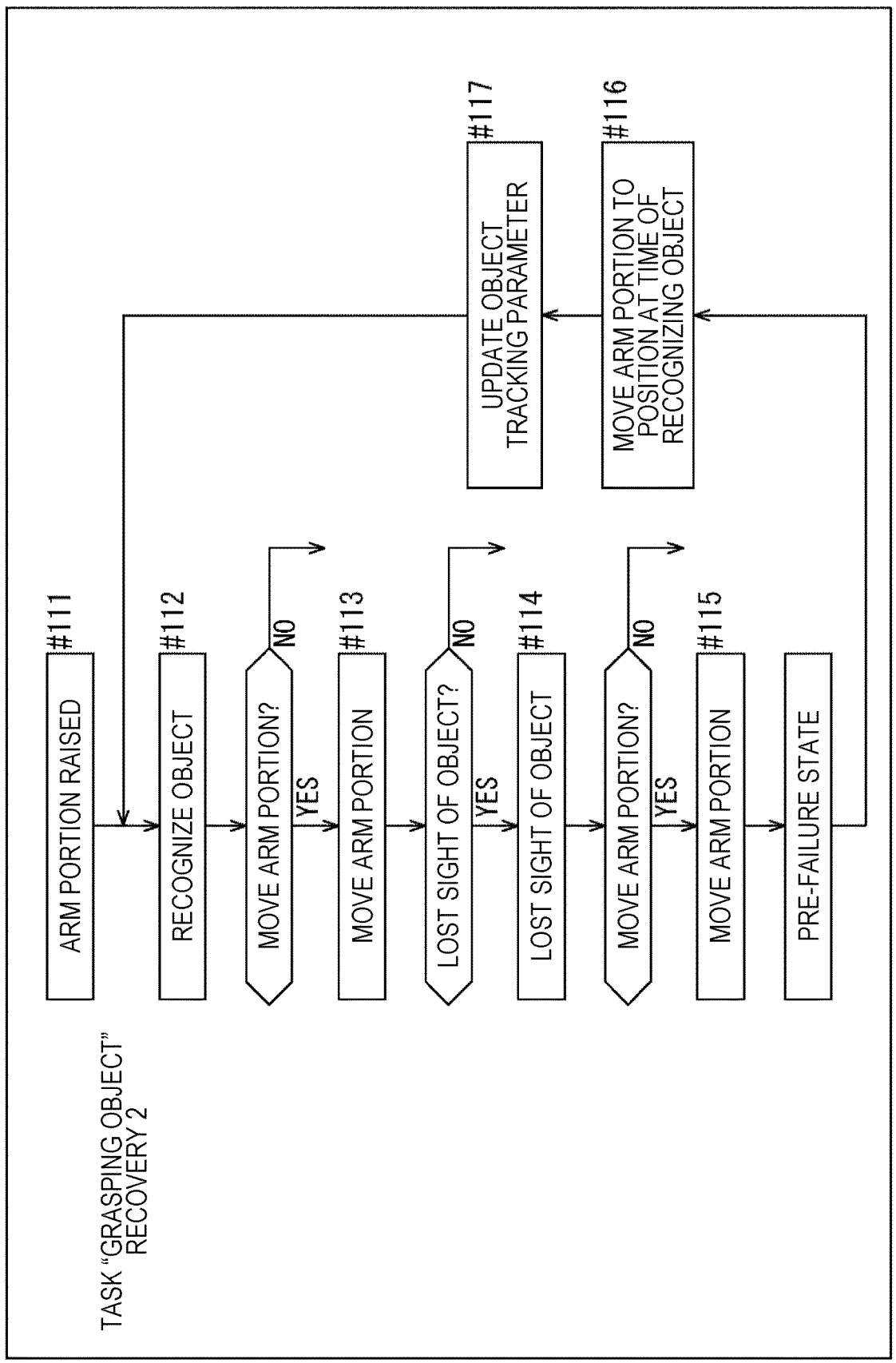
FIG. 17 is a diagram showing a second example of a failure state transition including a recovery for a task of "grasping an object".

FIG. 17 is a diagram showing a second example of a failure state transition including a recovery for a task of "grasping an object".

States #111 to #115 in FIG. 17 are similar to the states #1 to #5 in FIG. 2, respectively.

In the example of FIG. 17, in a case where the state #115, which is a state where the arm portion 12 is moved, is reached and it is determined that a pre-failure state is reached, the state of the robot 1 becomes a state #116, which is a state where the arm portion 12 is moved to a position where the object has been recognized. The robot 1 controls individual parts to move the arm portion 12 to a position immediately before the object is lost sight of.

After the state #116, which is a state where the arm portion 12 is moved to a position where the object has been recognized, is reached, the state of the robot 1 becomes a state #117, which is a state where an object tracking parameter is updated.

The object tracking parameter is a parameter for tracking the object on the basis of an image captured by the camera 41. In a case where the camera 41 is provided near the end of the arm portion 12, the object tracking parameter includes information such as the moving speed of the arm portion 12.

The robot 1 updates the object tracking parameter such as by decreasing the moving speed of the arm portion 12 such that the object is not lost sight of. Thereafter, the state of the robot 1 returns to the state #112, and a similar state transition is continued. In the example of FIG. 17, a recovery is performed by an operation of moving the arm portion 12 to a position immediately before the object is lost sight of and updating the object tracking parameter.

Recovery Example 3

Figure 18:
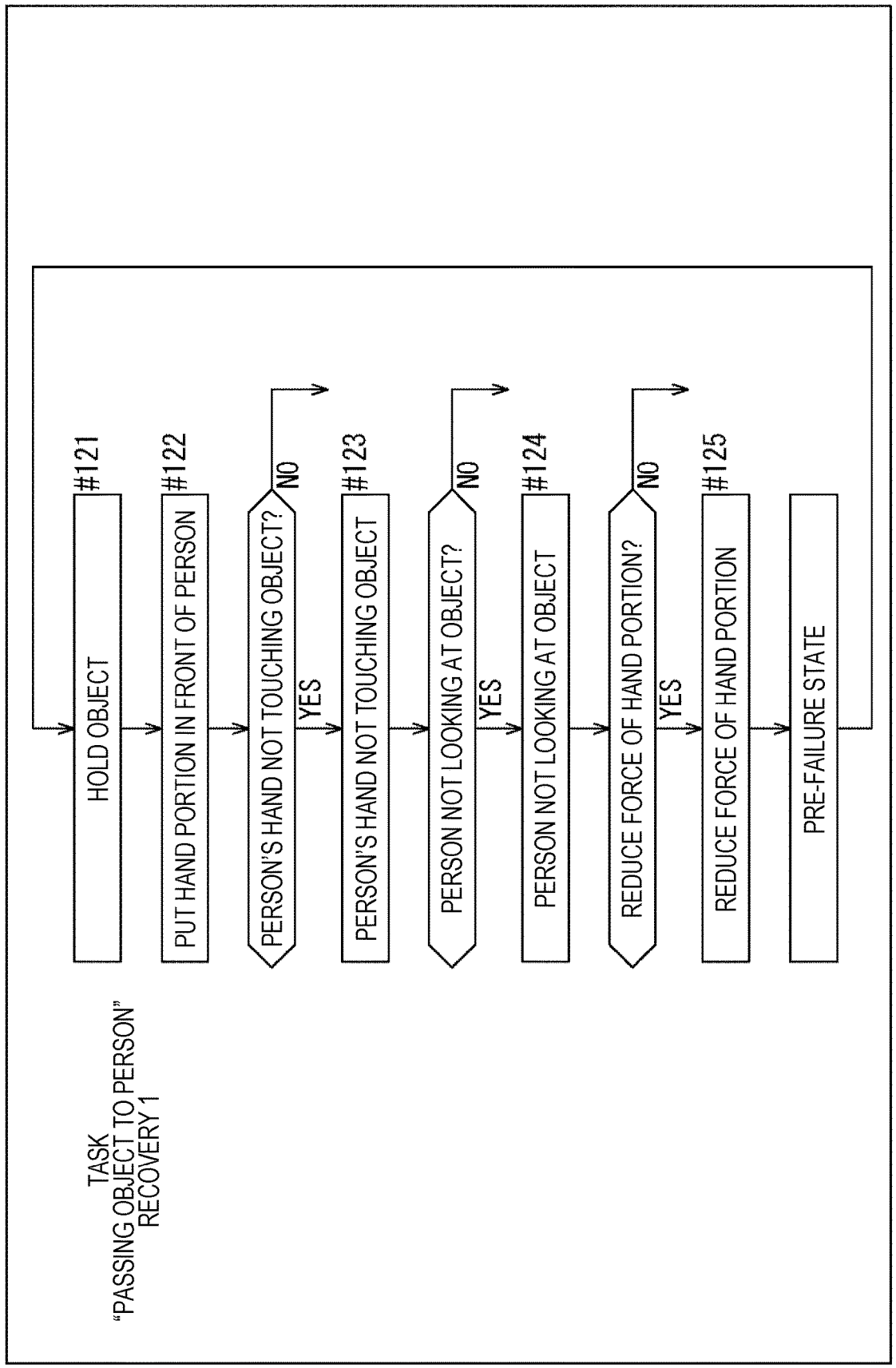
FIG. 18 is a diagram showing a first example of a failure state transition including a recovery for a task of "passing an object to a person".

FIG. 18 is a diagram showing a first example of a failure state transition including a recovery for a task of "passing an object to a person".

States #121 to #125 in FIG. 18 are similar to the states #11 to #15 in FIG. 3, respectively.

In the example of FIG. 18, in a case where the state #125, which is a state where the force of the hand portion 13 grasping the object is reduced, is reached and it is determined that a pre-failure state is reached, the state of the robot 1 returns to the state #121 again.

That is, in a case where the force of the hand portion 13 is to be reduced while the person to which the object is to be passed is not looking at the object, the robot 1 controls individual parts including the hand portion 13 to reach a state where the object is held. In the example of FIG. 18, a recovery is performed by an operation of controlling individual parts including the hand portion 13 to reach a state where the object is held.

Recovery Example 4

Figure 19:
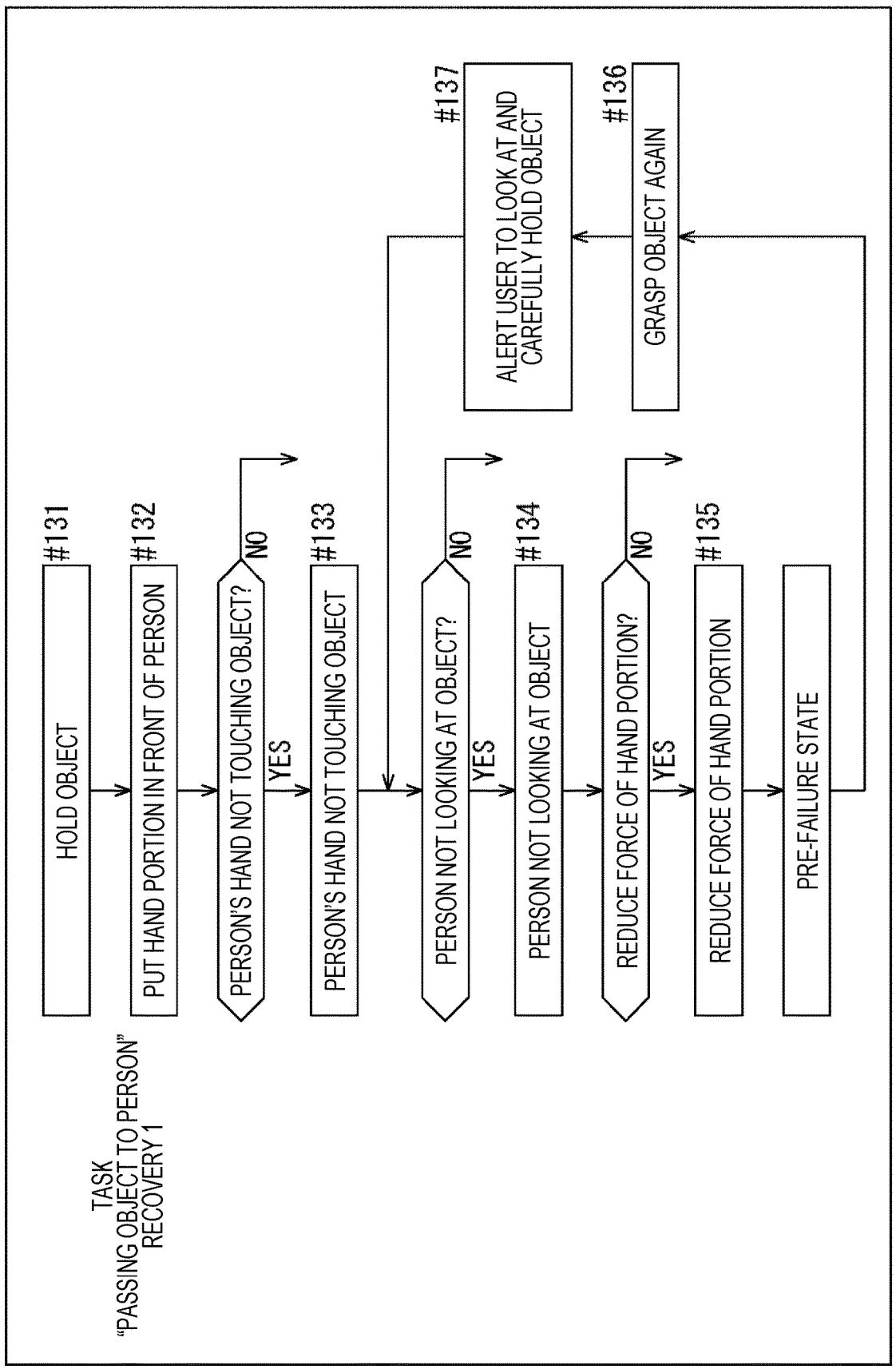
FIG. 19 is a diagram showing a second example of a failure state transition including a recovery for a task of "passing an object to a person".

FIG. 19 is a diagram showing a second example of a failure state transition including a recovery for a task of "passing an object to a person".

States #131 to #135 in FIG. 19 are similar to the states #11 to #15 in FIG. 3, respectively.

In the example of FIG. 19, in a case where the state #135, which is a state where the force of the hand portion 13 grasping the object is reduced, is reached and it is determined that a pre-failure state is reached, the state of the robot 1 becomes a state #136, which is a state where the object is grasped again. In a case where the force of the hand portion 13 is to be reduced while the person to which the object is to be passed is not looking at the object, the robot 1 controls individual parts including the hand portion 13 to grasp the object again.

After the state #136, which is a state where the object is grasped by the hand portion 13 again, the state of the robot 1 becomes a state #137, which is a state where the user is alerted to look at and carefully hold the object. After performing such an alert such as by outputting a sound from the speaker 43, the robot 1 determines whether the person is not looking at the object and repeats a similar state transition.

In the example of FIG. 19, a recovery is performed by an operation of controlling individual parts including the hand portion 13 to grasp the object again and alerting the user.

As described above, the failure state transition including the recovery is managed in the robot 1, and the recovery is performed in a case where the pre-failure state is reached. Therefore, the robot 1 can prevent the failure of the task and lead the task to success. The recovery may also be performed after the alert is performed.

Example Configuration of Recovery Control Section

Figure 20:
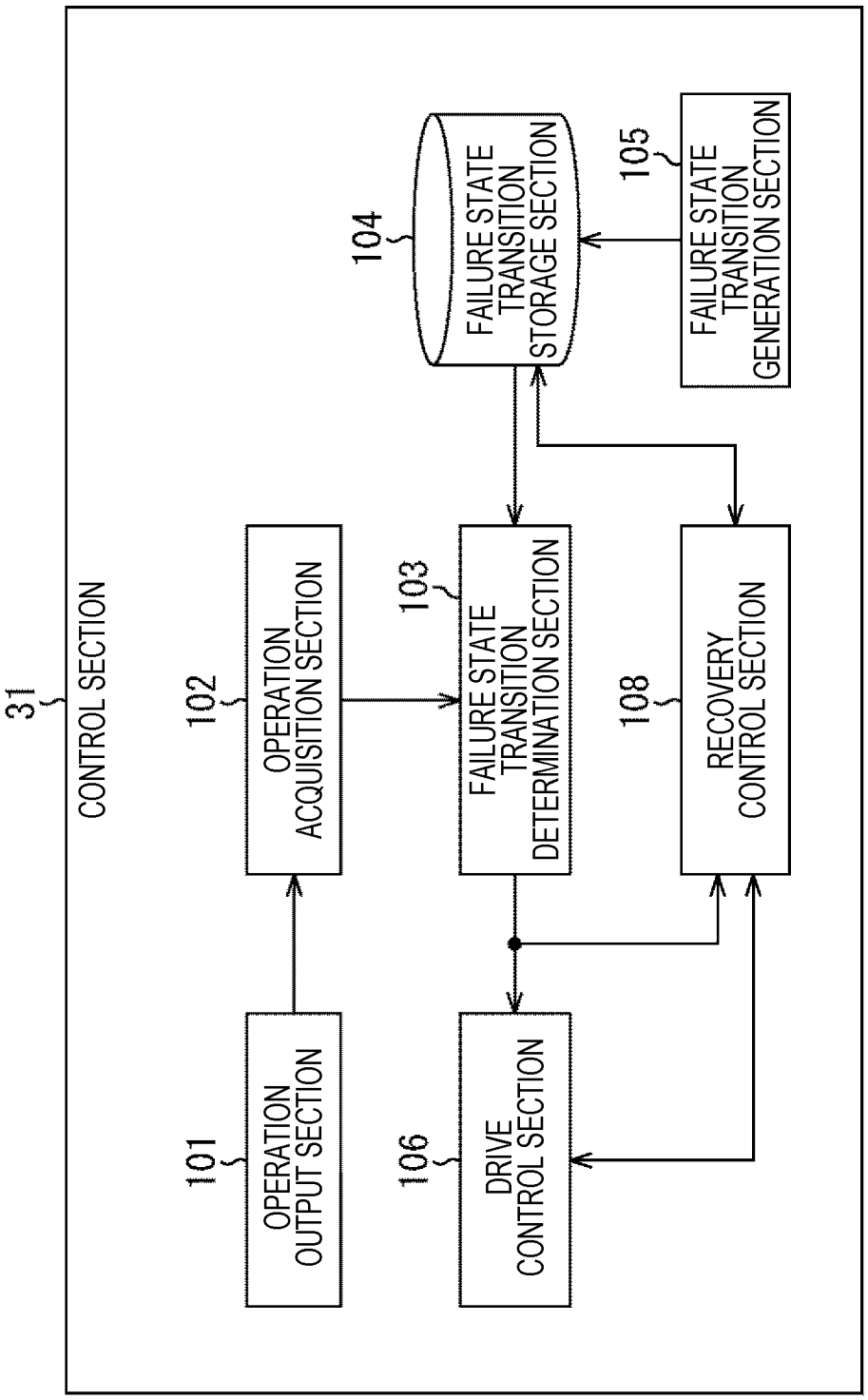
FIG. 20 is a block diagram showing another example functional configuration of the control section.

FIG. 20 is a block diagram showing another example functional configuration of the control section 31.

The configuration shown in FIG. 20 is basically the same as the configuration shown in FIG. 5 except that a recovery control section 108 is added. Overlapping descriptions will be omitted as appropriate.

In a case where it is determined that a pre-failure state is reached, the recovery control section 108 controls the drive control section 106 to perform a recovery. Whether or not the pre-failure state is reached is determined on the basis of information supplied from the failure state transition determination section 103 or information supplied from the drive control section 106.

Figure 21:
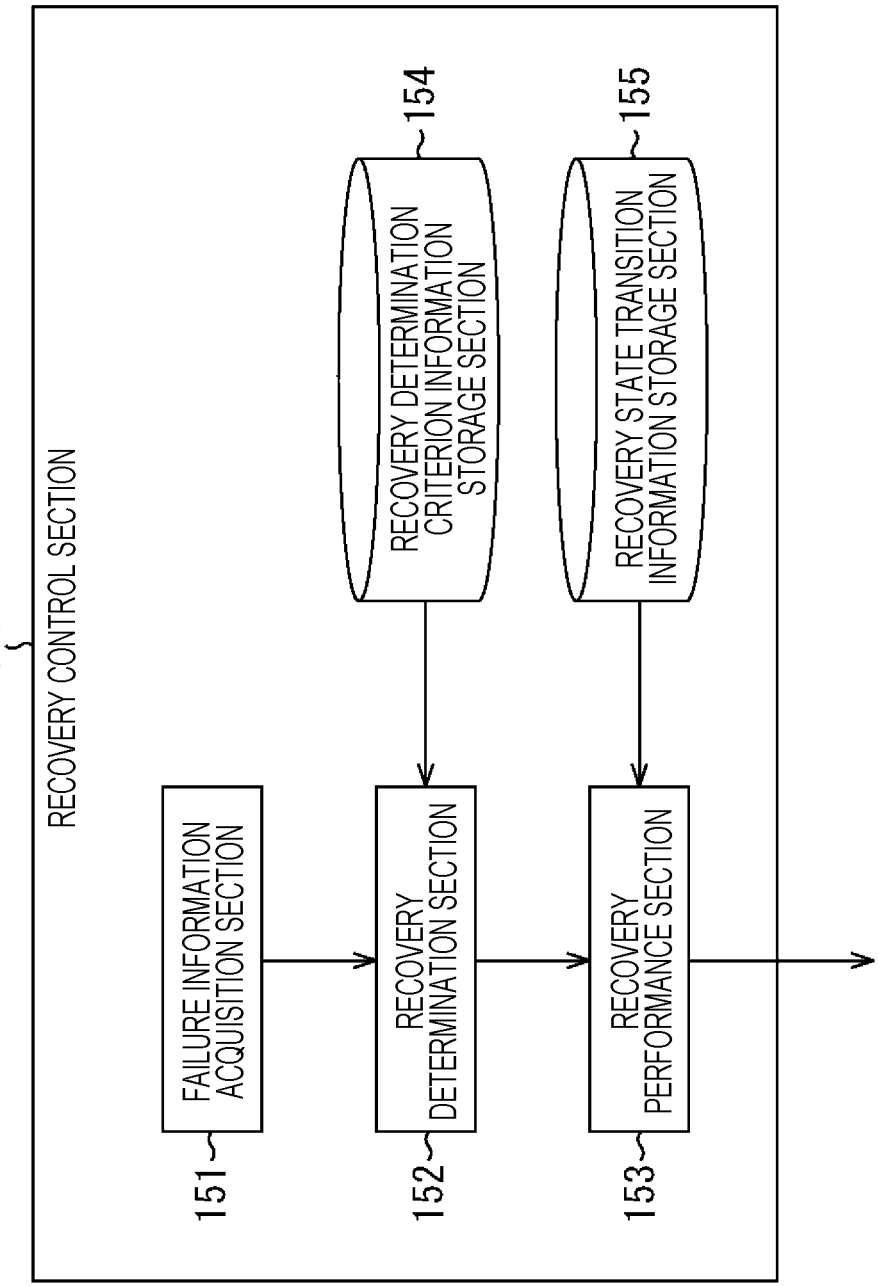
FIG. 21 is a block diagram showing an example configuration of a recovery control section.

FIG. 21 is a block diagram showing an example configuration of the recovery control section 108.

As shown in FIG. 21, the recovery control section 108 includes a failure information acquisition section 151, a recovery determination section 152, a recovery performance section 153, a recovery determination criterion information storage section 154, and a recovery state transition information storage section 155.

The failure information acquisition section 151 acquires information regarding failure of a task on the basis of information output from the failure state transition determination section 103 or the drive control section 106. For example, the failure information acquisition section 151 identifies the number of times the pre-failure state is reached, and outputs information indicating the identified number of times to the recovery determination section 152.

The recovery determination section 152 determines whether or not to perform the recovery on the basis of the information supplied from the failure information acquisition section 151. The recovery determination criterion information storage section 154 stores recovery determination criterion information that is a criterion for determination of whether or not to perform the recovery for each task.

Whether or not to perform the recovery is determined by, for example, comparing the number of times the pre-failure state is reached and a threshold number of times indicated by the recovery determination criterion information. In a case where the number of times the pre-failure state is reached for a predetermined task exceeds the threshold number of times, the recovery determination section 152 determines to perform the recovery, and outputs information indicating that to the recovery performance section 153.

The recovery performance section 153 performs the recovery on the basis of information stored in the recovery state transition information storage section 155. The recovery state transition information storage section 155 stores information regarding the failure state transition including the state of the recovery.

Recovery Performance Process

Figure 22:
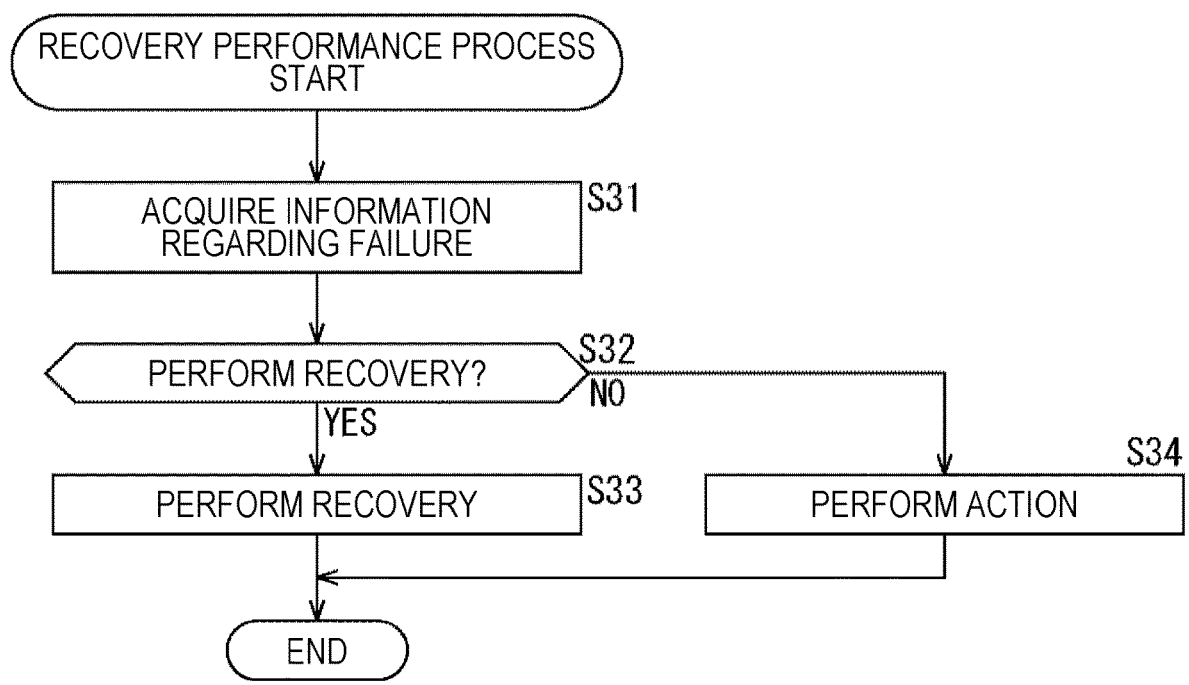
FIG. 22 is a flow chart illustrating a recovery performance process.

A process of performing a recovery by the robot 1 will be described with reference to the flow chart of FIG. 22.

In step S31, the failure information acquisition section 151 acquires information regarding failure of a task output from the failure state transition determination section 103. For example, the failure information acquisition section 151 acquires the number of times the pre-failure state is reached, the content of the failure, and the degree of seriousness of the failure as the information regarding the failure.

In step S32, the recovery determination section 152 determines whether or not to perform the recovery.

Here, for example, it is determined to perform the recovery in a case where the number of times the pre-failure state is reached becomes greater than or equal to a threshold number of times. Furthermore, it is determined to perform the recovery in a case where a failure with a lower degree of seriousness than a threshold degree.

In a case where it is determined to perform the recovery in step S32, in step S33, the recovery performance section 153 performs the recovery.

On the other hand, in a case where it is determined not to perform the recovery in step S32, in step S34, the recovery performance section 153 controls the drive control section 106 to perform a predetermined action.

As described above, the robot 1 performs the recovery before a task fails and can thereby prevent the failure of the task.

Modified Examples

The failure state transition may also be generated in the robot 1 according to user operation, instead of being generated by the robot 1 itself. Furthermore, failure state transition information generated according to user operation in an external device such as a PC may be provided to the robot 1 and used for the processes as described above.

The failure state transition information may be generated on the basis of a failure state transition that occurs in a test stage of the operation of the robot 1 and provided to the robot 1. Information regarding what state transition is a failure state transition is specified by the user, for example.

Furthermore, the user may set a state that should be avoided, on the basis of which the failure state transition information may be generated.

Although processes for cases of performing the tasks of "grasping an object" and "passing an object to a person" have been described above, similar processes are performed in a case of performing another task. In performing another task as well, in a case where the state transition of the robot 1 follows the same transition as the failure state transition, an action such as emergency stop is performed before failure occurs.

Example of Control System

The operation of the robot 1 based on the failure state transition may be performed by an external device such as a server on the Internet.

Figure 23:
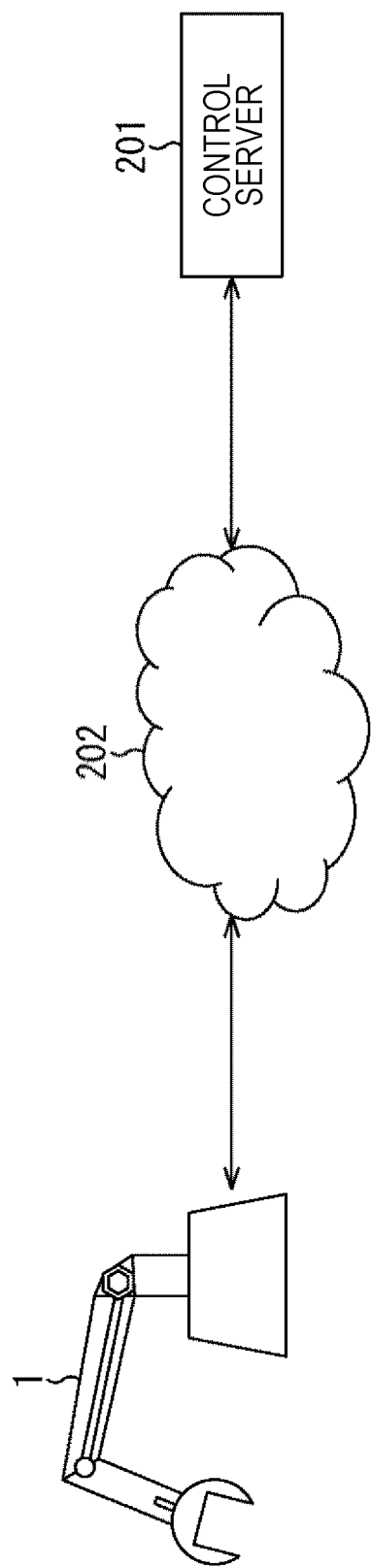
FIG. 23 is a diagram showing an example configuration of a control system.

FIG. 23 is a diagram showing an example configuration of a control system.

The control system in FIG. 23 is constituted by connecting the robot 1 and a control server 201 via a network 202 such as the Internet. The robot 1 and the control server 201 communicate with each other via the network 202.

In the control system in FIG. 23, the state of the robot 1 is identified by the control server 201 on the basis of information sent from the robot 1. Information indicating the state of each device of the robot 1 is sequentially sent from the robot 1 to the control server 201.

In a case where it is detected that the state transition of the robot 1 follows a failure state transition, the control server 201 controls the robot 1 to perform an action corresponding to the state such as an action of alert or an action for the time of task failure.

Thus, the control server 201 functions as a control device that monitors the state of the robot 1 and controls the operation of the robot 1 according to the state. In the control server 201, a predetermined program is executed to realize each functional section in FIG. 5, FIG. 14, or FIG. 20.

Example Configuration of Computer

The series of processes described above can be executed by hardware or executed by software. In a case where the series of processes are executed by software, programs constituting the software are installed on a computer integrated into dedicated hardware, a general-purpose personal computer, or the like from a program recording medium.

FIG. 24 is a block diagram showing an example hardware configuration of a computer that programmatically executes the series of processes described above. The control server 201 in FIG. 23 has a configuration similar to the configuration shown in FIG. 24.

A central processing unit (CPU) 1001, a read only memory (ROM) 1002, and a random access memory (RAM) 1003 are connected to each other by a bus 1004.

An input/output interface 1005 is further connected to the bus 1004. An input section 1006 including a keyboard, a mouse, and the like and an output section 1007 including a display, a speaker, and the like are connected to the input/output interface 1005. Furthermore, a storage section 1008 including a hard disk, a non-volatile memory, and the like, a communication section 1009 including a network interface and the like, and a drive 1010 that drives a removable medium 1011 are connected to the input/output interface 1005.

In the computer configured as described above, the series of processes described above are performed by the CPU1001 loading programs stored in the storage section 1008 on the RAM 1003 via the input/output interface 1005 and the bus 1004 and executing them, for example.

The programs executed by the CPU1001 are provided by being recorded in the removable medium 1011 or via a wired or wireless transmission medium such as a local area network, the Internet, or digital broadcast, for example, and installed on the storage section 1008.

Note that the programs executed by the computer may be programs in which processes are executed on a time-series basis in the order described herein, or may be programs in which processes are executed in parallel or at a required timing such as when a call occurs.

As used herein, a system refers to a set of a plurality of components (such as devices and modules (parts)), and it does not matter whether or not all the components are in the same housing. Therefore, a plurality of devices housed in separate housings and connected via a network and one device in which a plurality of modules is housed in one housing are both systems.

The effects described herein are merely examples and are not limited, and there may be other effects.

Embodiments of the present technology are not limited to the embodiments described above, and various modifications are possible without departing from the spirit of the present technology.

For example, the present technology can take a configuration of cloud computing in which one function is distributively and jointly processed by a plurality of devices via a network.

Furthermore, each step described in the flow charts described above can be performed not only by one device but also distributively performed by a plurality of devices.

Moreover, in a case where one step includes a plurality of processes, the plurality of processes included in the one step can be performed not only by one device but also distributively performed by a plurality of devices.

Examples of Combination of Configurations

The present technology can also have the following configurations.

(1)

A control device including:

a state transition determination section that controls an operation of a robot to perform a predetermined process before a task results in failure in a case where a state transition of the robot in performing the task follows a failure state transition that is preset as a state transition that results in the failure of the task.

(2)

The control device according to (1) above, in which the predetermined process is an alert to a user or an emergency stop of the operation of the robot.

(3)

The control device according to (2) above, in which the state transition determination section performs the emergency stop of the operation of the robot in a case where the state transition of the robot follows the failure state transition after the alert to the user is performed as the predetermined process.

(4)

The control device according to any one of (1) to (3), further including:
an update section that updates the failure state transition in a case where the state transition of the robot follows the failure state transition.

(5)

The control device according to (4) above, in which the update section updates the failure state transition in a case where a number of times the failure state transition is followed exceeds a threshold number of times or according to a content of the state transition of the robot that follows the failure state transition.

(6)

The control device according to (4) or (5) above, in which the update section updates the failure state transition such that the state transition of the robot is more likely to follow the failure state transition.

(7)

The control device according to any one of (1) to (6) above, further including:
a recovery control section that controls the robot to perform a recovery in a case where the state transition of the robot follows the failure state transition.

(8)

The control device according to (7) above, in which the recovery control section causes the recovery to be performed after the predetermined process is performed.

(9)

The control device according to any one of (1) to (8) above, further including:
a storage section that stores information indicating the failure state transition.

(10)

A control method including:
controlling, by a control device, an operation of a robot to perform a predetermined process before a task results in failure in a case where a state transition of the robot in performing the task follows a failure state transition that is preset as a state transition that results in the failure of the task.

(11)

A program for causing a computer to perform a process of:
controlling an operation of a robot to perform a predetermined process before a task results in failure in a case where a state transition of the robot in performing the task follows a failure state transition that is preset as a state transition that results in the failure of the task.

REFERENCE SIGNS LIST 1, 2 Robot
11 Base portion
12 Arm portion
13 Hand portion
31 Control section
33 Drive section
41 Camera
101 Operation output section
102 Operation acquisition section
103 Failure state transition determination section
104 Failure state transition storage section
105 Failure state transition generation section
106 Drive control section
107 Failure state transition update section
108 Recovery control section
131 Failure information acquisition section
132 Update determination section
133 Update section
134 Update determination criterion information storage section
135 Update transition information storage section
151 Failure information acquisition section
152 Recovery determination section
153 Recovery performance section
154 Recovery determination criterion information storage section
155 Recovery state transition information storage section
201 Control server
202 Network

The invention claimed is:

1. A control device comprising:
a state transition determination section configured to control an operation of a robot to perform a predetermined process before a task results in failure in a case where a state transition of the robot in performing the task follows a failure state transition that is preset as a pre-failure state,
wherein the predetermined process to be performed by the robot is determined based on
a comparison between a degree of seriousness of the pre-failure state indicated by the failure state transition and a threshold degree, and
a comparison between a number of times the pre-failure state is reached and a threshold number of times,
wherein the threshold number of times is determined according to a result of the comparison between the degree of seriousness of the pre-failure state indicated by the failure state transition and the threshold degree, and
wherein the state transition determination section is implemented via at least one processor.

2. The control device according to claim 1, wherein the predetermined process is an alert to a user or an emergency stop of the operation of the robot.

3. The control device according to claim 2, wherein the state transition determination section performs the emergency stop of the operation of the robot in a case where the state transition of the robot follows the failure state transition after the alert to the user is performed as the predetermined process.

4. The control device according to claim 1, further comprising:
an update section configured to update the failure state transition in a case where the state transition of the robot follows the failure state transition,
wherein the update section is implemented via at least one processor.

5. The control device according to claim 4, wherein the update section updates the failure state transition in a case where the number of times the pre-failure state is reached exceeds the threshold number of times.

6. The control device according to claim 4, wherein the update section updates the failure state transition such that the state transition of the robot is more likely to follow the failure state transition.

7. The control device according to claim 4, wherein the update section updates the failure state transition according to content indicating the state transition of the robot that follows the failure state transition.

8. The control device according to claim 4, wherein the failure state transition is preset according to a size of an object grasped by the robot during the operation of the robot.

9. The control device according to claim 1, further comprising:
   a recovery control section configured to control the robot to perform a recovery in a case where the state transition of the robot follows the failure state transition,
   wherein the recovery control section is implemented via at least one processor.

10. The control device according to claim 9, wherein the recovery control section causes the recovery to be performed after the predetermined process is performed.

11. The control device according to claim 1, further comprising:
   a storage section configured to store information indicating the failure state transition,
   wherein the storage section is implemented via at least one non-transitory computer-readable storage medium.

12. A control method comprising:
   controlling, by a control device, an operation of a robot to perform a predetermined process before a task results in failure in a case where a state transition of the robot in performing the task follows a failure state transition that is preset as a pre-failure state,
   wherein the predetermined process to be performed by the robot is determined based on
      a comparison between a degree of seriousness of the pre-failure state indicated by the failure state transition and a threshold degree, and
      a comparison between a number of times the pre-failure state is reached and a threshold number of times, and
   wherein the threshold number of times is determined according to a result of the comparison between the degree of seriousness of the pre-failure state indicated by the failure state transition and the threshold degree.

13. A non-transitory computer-readable storage medium having embodied thereon a program, which when executed by a computer causes the computer to execute a method, the method comprising:
   controlling an operation of a robot to perform a predetermined process before a task results in failure in a case where a state transition of the robot in performing the task follows a failure state transition that is preset as a pre-failure state,
   wherein the predetermined process to be performed by the robot is determined based on
      a comparison between a degree of seriousness of the pre-failure state indicated by the failure state transition and a threshold degree, and
      a comparison between a number of times the pre-failure state is reached and a threshold number of times, and
   wherein the threshold number of times is determined according to a result of the comparison between the degree of seriousness of the pre-failure state indicated by the failure state transition and the threshold degree.

* * * * *